(12) United States Patent
Burke et al.

(10) Patent No.: US 7,603,381 B2
(45) Date of Patent: Oct. 13, 2009

(54) CONTEXTUAL ACTION PUBLISHING

(75) Inventors: Jonah Sarbin Burke, Seattle, WA (US); Howard Morrison Crow, III, Sammamish, WA (US); Targo Tennisberg, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 262 days.

(21) Appl. No.: 10/955,945

(22) Filed: Sep. 30, 2004

(65) Prior Publication Data
US 2006/0069666 A1  Mar. 30, 2006

(51) Int. Cl.
*G06F 17/00* (2006.01)

(52) U.S. Cl. ............... 707/104.1; 707/101; 707/102; 707/103 R; 705/7; 705/28; 705/500; 717/108; 717/116; 717/165

(58) Field of Classification Search ......... 707/101–102, 707/103 R, 104.1; 705/7, 28, 500; 717/108, 717/116, 165
See application file for complete search history.

(56) References Cited

U.S. PATENT DOCUMENTS

| | | | | |
|---|---|---|---|---|
| 6,106,569 | A * | 8/2000 | Bohrer et al. | 717/100 |
| 6,442,748 | B1 * | 8/2002 | Bowman-Amuah | 717/108 |
| 6,574,636 | B1 * | 6/2003 | Balon et al. | 707/103 R |
| 6,922,695 | B2 * | 7/2005 | Skufca et al. | 707/10 |
| 6,978,423 | B2 * | 12/2005 | Seetharaman et al. | 715/764 |
| 6,985,912 | B2 * | 1/2006 | Mullins et al. | 707/103 R |
| 6,985,922 | B1 * | 1/2006 | Bashen et al. | 709/203 |
| 7,310,653 | B2 * | 12/2007 | Coyle et al. | 707/203 |
| 2003/0028540 | A1 * | 2/2003 | Lindberg et al. | 707/100 |
| 2003/0088536 | A1 * | 5/2003 | Behnia | 707/1 |
| 2004/0019586 | A1 * | 1/2004 | Harter | 707/1 |
| 2004/0122826 | A1 * | 6/2004 | Mackie | 707/100 |
| 2004/0177028 | A1 * | 9/2004 | Francis et al. | 705/37 |
| 2004/0181539 | A1 * | 9/2004 | Munson et al. | 707/100 |
| 2004/0249823 | A1 * | 12/2004 | Raghuvir et al. | 707/100 |
| 2005/0021557 | A1 * | 1/2005 | Brendle et al. | 707/103 R |
| 2005/0154744 | A1 * | 7/2005 | Morinville | 707/100 |
| 2005/0182789 | A1 * | 8/2005 | Konnersman | 707/103 R |
| 2006/0026178 | A1 * | 2/2006 | Wolf et al. | 707/100 |
| 2006/0031237 | A1 * | 2/2006 | DeAnna et al. | 707/100 |

OTHER PUBLICATIONS

European Patent Communication dated Jan. 16, 2009 (Application No. 05 105 042.5-2221).

(Continued)

*Primary Examiner*—Apu M Mofiz
*Assistant Examiner*—Hung D Le
(74) *Attorney, Agent, or Firm*—Merchant & Gould

(57) ABSTRACT

A computing system for the publication of actions associated with the current context of an entity, such as a business object is provided. The computing system has a component that stores entities, a component that stores the actions associated with the entities, and a software component that provides information about the current context or contexts of an entity and actions associated with the current contexts of the entity. The computing system may further include a client system that requests and displays the actions associated with the current contexts of an entity. A method for contextual publication of actions associated with an entity is also provided. The method provides the current contexts of the entity. The method further provides the actions associated with the current contexts of the entity. Multiple user interfaces are provided for the management of and access to actions associated an entity.

17 Claims, 20 Drawing Sheets

OTHER PUBLICATIONS

Chinese Office Action dated Sep. 5, 2008 cited in Application No. 200510089361.9.
European Search Report dated Dec. 11, 2007 cited in Application No. 05105042.5-2221.

XP002456252, "Statement in Accordance with the Notice from the European Patent Office dated Oct. 1, 2007 concerning business methods," Official Journal of the European Patent Office, Nov. 2007, p. 592-593.

* cited by examiner

CONTEXTUAL ACTION PUBLISHING

FIELD OF THE INVENTION

The present invention relates to business objects and, in particular, to a computing system and program that enables contextual publishing of actions associated with a business object.

BACKGROUND OF THE INVENTION

A business can be modeled in terms of objects that make up the business and how the objects interact. Generally, business objects represent things, processes, or events that are meaningful to the conduct of the business. For example, a business object can represent inventory, invoices, customers, or sales people. A business object can also represent purchases, sales, or other types of transactions that occur when conducting business. The resultant model is usually called a business object model.

The conventional architecture of a business object model is one in which the data, business rules, and actions (operations) relating to each business object are logically and/or physically tightly coupled to the business object. For example, a business object and its associated data, business rules, and actions may be physically stored together in a file server, or logically treated as one unit. FIG. 1 illustrates one conventional way of tightly coupling business objects to their associated actions. In general, an action associated with a business object is a piece of metadata that describes how to represent an activity to a user, and how to execute the necessary logic to perform this activity. In the example illustrated in FIG. 1, business objects are stored in an enterprise data management system, such as SAP 102, SIEBEL 104, and SQL 106. Business objects may also be stored in other data management systems 108. Data management systems 102-108 provide adaptors 112, through which client applications 120 may access and use business objects and their associated actions.

The conventional way of storing business objects along with their associated data, rules, and actions has several limitations. For example, the tight coupling of business objects and their associated actions limits the expansion of functionalities associated with a business object. A user cannot conveniently associate new actions with a business object. Contrariwise, if the actions and the business objects are stored separately, a user may be able to associate actions with any business object at the user's preference. For example, actions A and B are associated with business object 1, and actions C and D are associated with business object 2. Conventionally, actions A and B are tied to with business object 1, and actions C and D are tied to business object 2. By severing the tie between actions and the business objects they are associated with, the functionalities associated with a business object can be dynamically adjusted, allowing a user to easily associate additional actions with a business object. For example, if actions A, B, C, and D are separated from business objects 1 and 2, a user may freely associate these actions with any of the business objects 1 and 2. This enables a business object to have a wider range of functionalities.

Further, in today's enterprise applications, there are many different factors that affect what a user can do with a business object. These factors include whom the user is, what kind of data the user is looking at, where the user is in the workflow, etc. These factors form the context in which the user operates the business object. Context thus is a piece of information that captures data about the environment in which the business object is used. It can be inferred from data, a user's role, application settings, etc.

Different actions may be associated with a business object in different contexts. For example, the role of a user who is using a business object affects what actions the user may perform on the business object. For a business object such as "customer," if the user of the "customer" business object is an administrator, the actions associated with the "customer" business object may include "Edit actions," and/or "Add actions." These two actions give the administrator the ability to modify existing actions associated with a business object and to associate new actions with the business object. On the other hand, if a user of the "customer" business object is someone other than the administrator, the user may not be able to edit or add actions associated with the "customer" business object. Since different actions may be associated with a business object in different contexts, it is desirable to be able to inform users about the actions associated with the business object in the current context. This amounts to contextual publication of actions associated with a business object.

In summary, there is a need for a business object model that separates the business objects from their associated actions so as to enable dynamic association of the actions with the business objects. There is also a need to contextually publish actions associated with a business object. The present invention provides a computing system and a program directed to satisfying these needs.

SUMMARY OF THE INVENTION

The present invention addresses the above-described needs by providing a computing system that enables publication of actions associated with an entity, such as a business object, having one or more contexts. The computing system separates the entity from its associated actions. The computing system includes a processor, computer readable storage and a display. The computing system also includes a software component that provides information about the current context(s) of an entity and the actions associated with the entity in the current context(s). The computing system may further include a client application that uses an entity and displays the actions associated with the entity in one or more contexts. Other aspects of the present invention provide a method for contextual publication of actions associated with an entity in one or more contexts. Further aspects of the present invention provide multiple user interfaces that enable a user to manage and access actions associated with an entity.

One exemplary embodiment of the present invention provides a computing system that hosts multiple components. One component stores the entities. Another component, called an action metadata store, stores the actions associated with the entities. The computing system also includes a software component that provides information about the context(s) that an entity is currently in and the actions associated with the entity in the context(s). The computing system may further include one or more client applications that use one or more entities. A client application requests the context(s) that an entity is in and the actions associated with the entity in the context(s). The client application may display the actions associated with the entity in the context(s).

In exemplary embodiments of the invention, a software component included in the computing system provides information about the current context that an entity is in and the actions associated with the entity in the current context. More specifically, the software component includes a context provider module that identifies one or more contexts associated with an entity. The software component further includes an action provider module that queries the action metadata store and retrieves actions associated with an entity in one or more contexts. Preferably, the action provider module returns information about the actions to the client application that uses the entity in the context(s). The client application may perform various functions with the actions, including displaying the actions associated with the entity in the context(s).

In accordance with another aspect of the invention, the software component may further include multiple context resolvers. Each of the context resolvers corresponds to a context. A context resolver translates a context into a keyword that identifies the context. Upon receiving a request for actions associated with an entity in a certain context or contexts, the action provider module passes the context information to the multiple context resolvers, which return a set of keywords corresponding to the contexts. The action provider module constructs a query including the keywords and sends the query to the action metadata store. The action metadata store annotates the actions with one or more keywords. Preferably, each action has a field called CombinationMode. If the CombinationMode field of an action is set to be "ALL," the action will be returned upon a receipt of query that includes all of the keywords annotating the action. If the CombinationMode field is set to be "ANY," the action will be retrieved upon receipt of a query that includes at least one of the keywords annotating the action.

Another aspect of the invention provides multiple user interfaces for a user to manage or access actions associated with an entity. An administrative user interface is provided that allows a user to act as an administrator and to manage the actions associated with an entity. The administrative user interface allows the administrator to associate a new action with the entity. It also allows the administrator to modify the properties of an action. The administrative user interface also allows the administrator to manage the actions Menu, i.e., the user interface that displays actions associated with an entity in its current contexts.

The invention further provides a method for activating the actions Menu associated with an entity. The actions Menu has three major states: a default state, a focus/mouse-over state, and a menu state. When inactivated or not in focus, an actions Menu is in the default state which may be represented by an icon, for example. The actions Menu may transition from the default state to the focus/mouse-over state if the icon is tabbed into focus or when a pointing device, such as a mouse, is moved over the icon representing the actions Menu. The actions Menu transitions into the menu state and fully displays the actions associated with the entity in its current contexts, when a user actuates the icon representing the actions Menu and the actions Menu is in its focus/mouse-over state.

A further aspect of the invention provides an actions Web Part. The actions Web Part displays a list of actions associated with an entity in various styles. A user may modify the properties associated with the actions Web Part. A user may also specify the display order of the actions in the actions Web Part by switching the actions Web Part into its edit mode, and dragging and dropping the action items.

In summary, the invention provides a computing system that separates entities from their associated actions. The invention further provides a method for displaying actions associated with an entity in one or more contexts. The invention further provides multiple user interfaces that allow the actions associated with an entity to be managed and accessed. Consequently, the invention enables dynamic association of actions and entities, and enables the contextual publication of actions associated with entities.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

The present invention is directed to a computing system, a computer-implemented method, and multiple user interfaces for publishing actions associated with the current context of a business object. Aspects of the present invention may be embodied in a computing system that separately stores business objects and their associated actions. Additionally, aspects of the present invention may be embodied in a computer-implemented method that provides information about the current context of a business object and the actions associated with the business object in this context. Furthermore, aspects of the invention may be embodied in multiple user interfaces that allow a user to manage and access actions associated with a business object.

The present invention will primarily be described in the context of a single computing system. However, aspects of the present invention can also be implemented in a distributed computing environment. For example, business objects and their associated actions may be stored separately and remotely in different database servers. Client applications using the business objects and their associated actions may run on different client systems, separated from the system that runs the software component that provides information about the current context of the business object and the actions associated with the business object in this context. Further, although the present invention will primarily be described in connection with the managing and accessing actions associated with business objects, those skilled in the relevant art and others will appreciate that the present invention is also applicable to other data objects, such as programming objects, user interface objects, etc. For this reason, hereinafter the term "entity" is used in lieu of "business object."

The following description first describes a computing system in which the present invention may be implemented. Then a computer-implemented method for providing information about the current context of an entity and the actions associated with the entity in this context is described. Finally, multiple user interfaces that allow management and access of actions associated with the entity are described. The illustrative examples provided herein are not intended to be exhaustive or to limit the invention to the precise forms disclosed. Similarly, any steps described herein may be interchangeable with other steps, or combinations of steps, in the same or a different order to achieve the same result.

Figure 1:
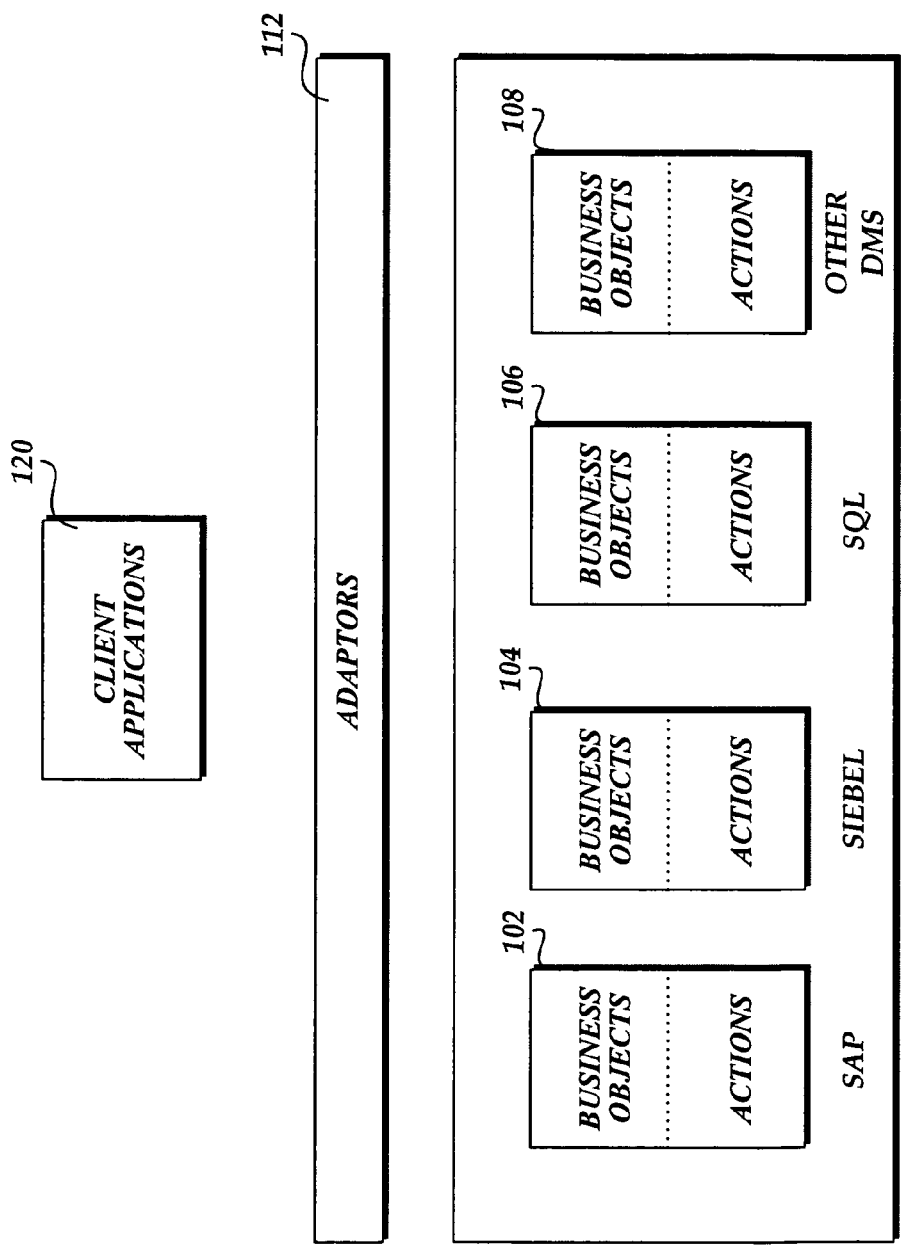
FIG. 1 is a block diagram illustrating one conventional way of tightly coupling of business objects to their associated actions.
Figure 2:
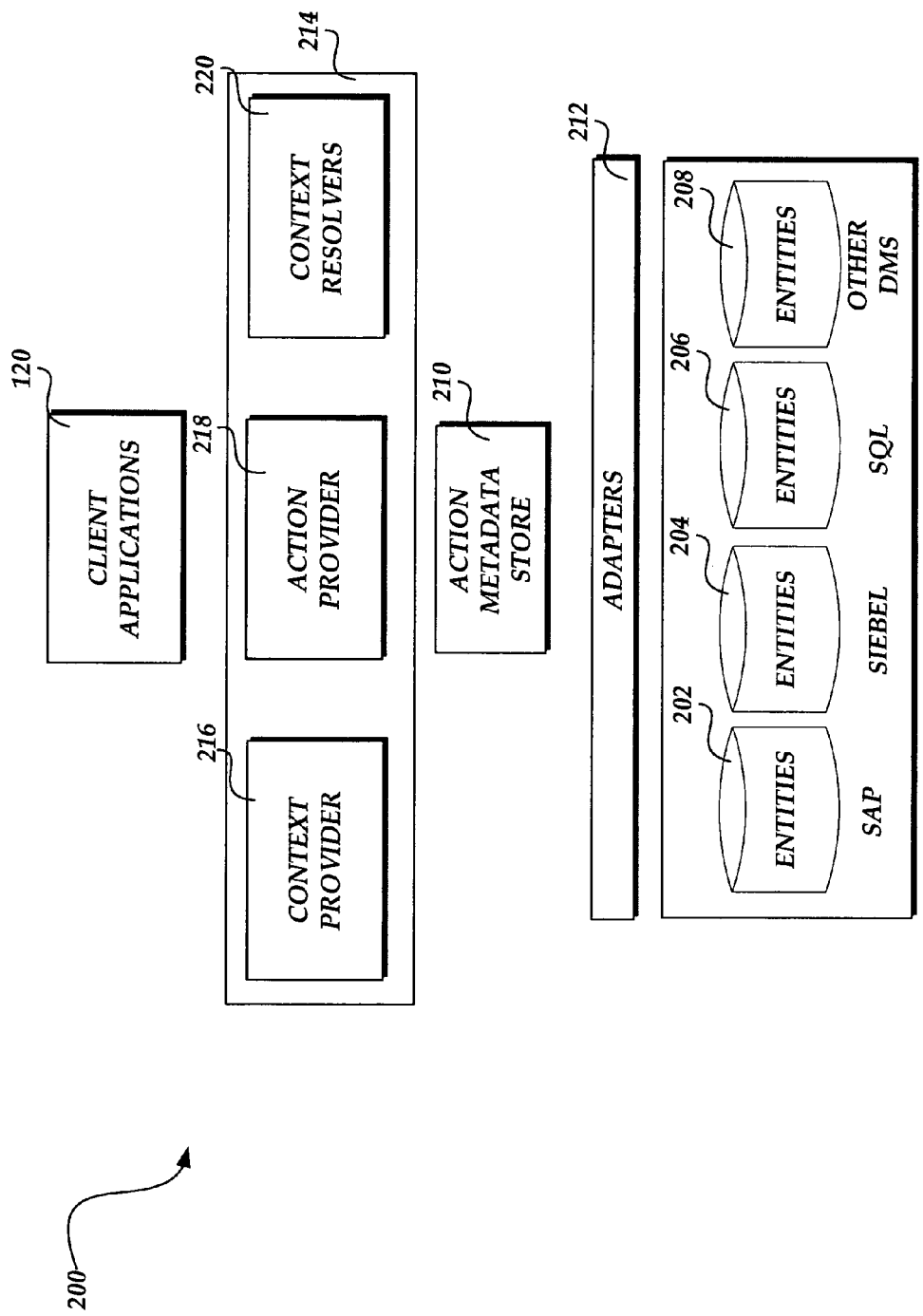
FIG. 2 is a block diagram illustrating one exemplary embodiment of the present invention.
Figure 6A:
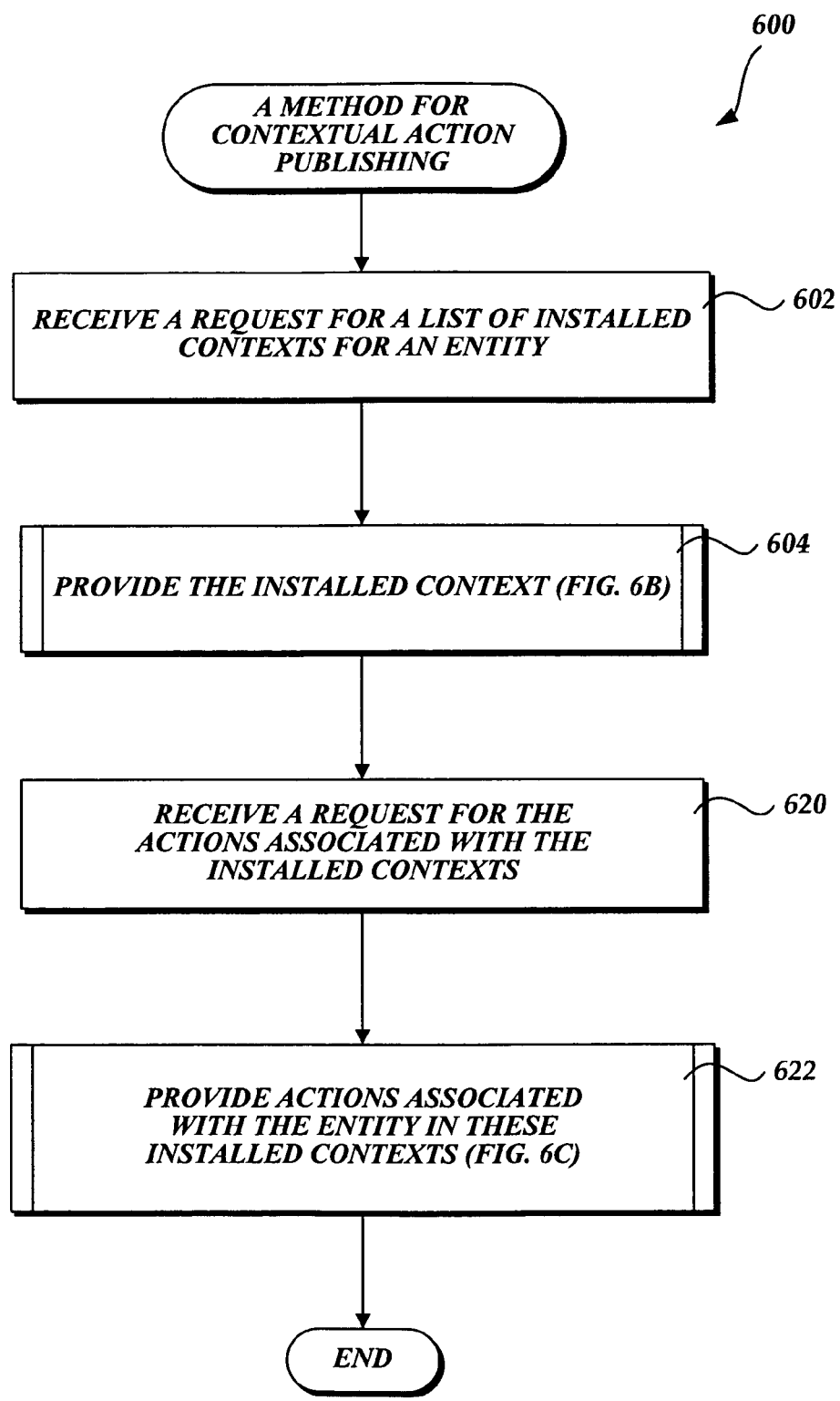
FIGS. 6A-6C are functional flow diagrams illustrating an exemplary method for contextual action publishing.
Figure 6B:
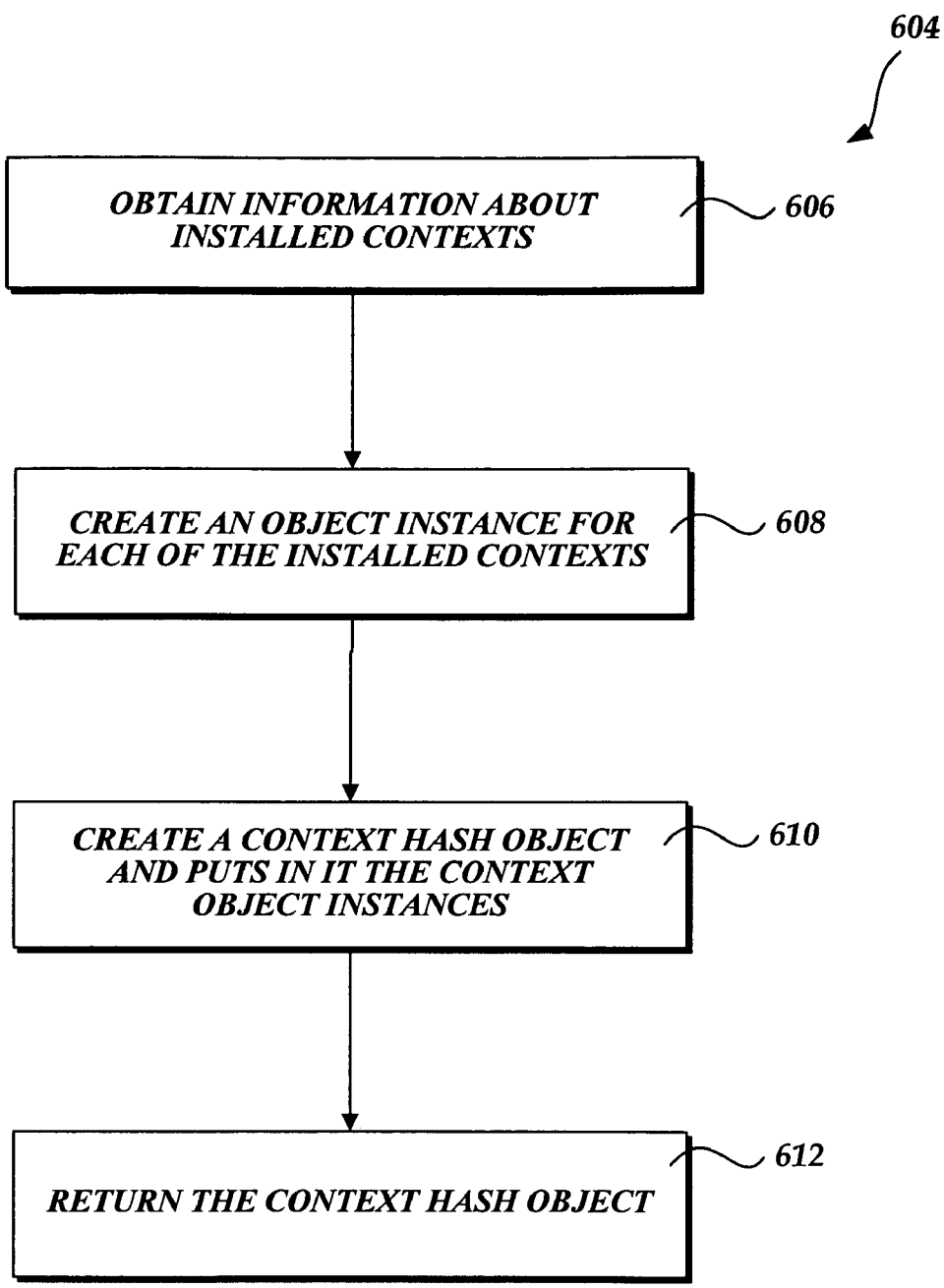
Figure 6C:
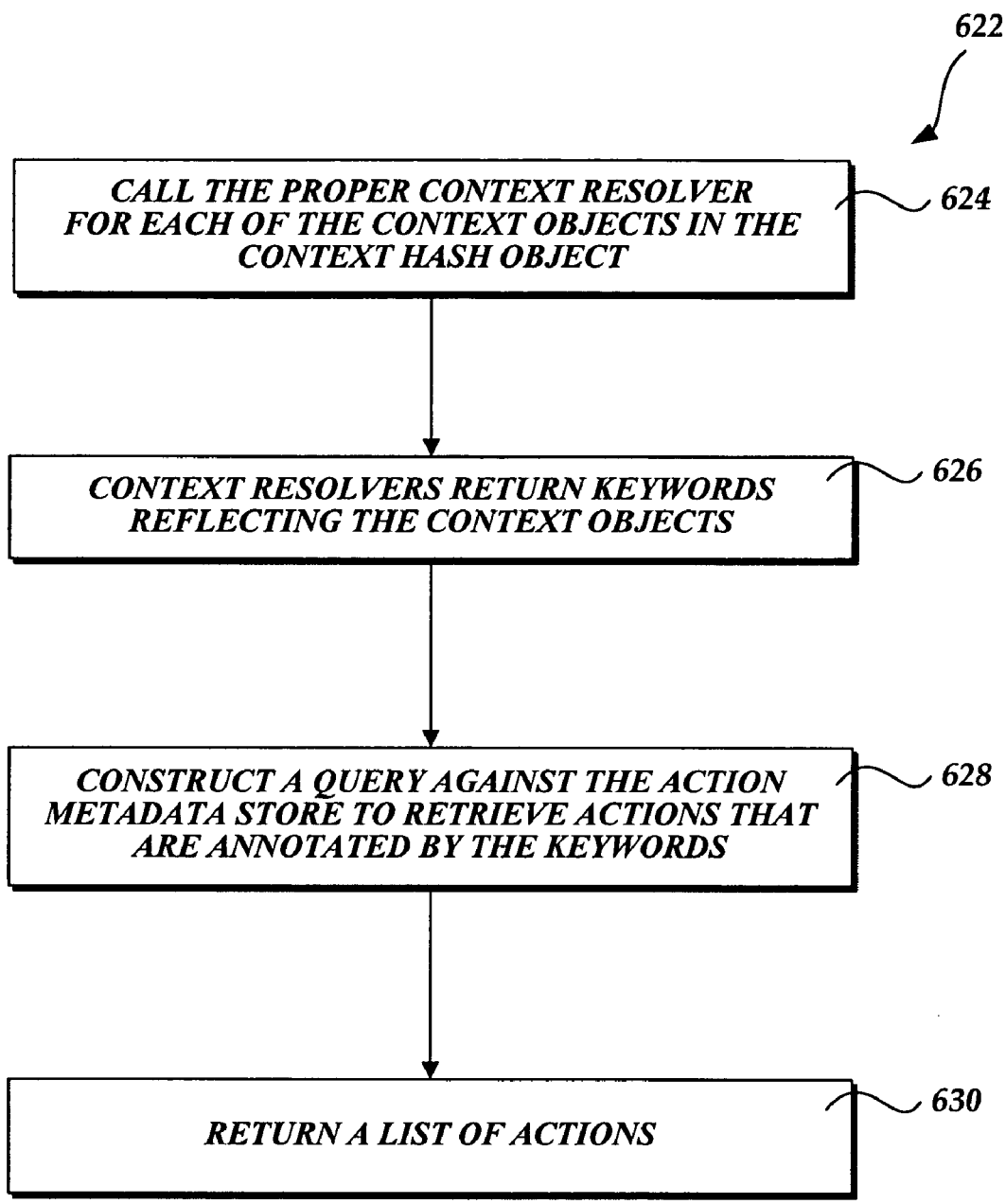

FIG. 2 illustrates an exemplary computing system 200 suitable for implementing the present invention. Conventionally, as noted above, entities and their associated actions are tightly coupled together, physically or logically. This tight coupling of entities and associated actions limit the dynamic association of actions with entities. It also limits the ability to contextually display the actions associated with an entity. To address these limitations, the present invention provides a computing system 200 that separates entities from their associated actions. For example, as shown in FIG. 2, entities are stored in data management applications such as SAP 202, SIEBEL 204, SQL 206, or any other type of data management application 208. The actions associated with these entities are congregated in a place called an action metadata store 210, which is separated from the data management applications 202-208 where the entities associated with the actions are located. The data management applications 202-208 communicate with the action metadata store 210 through adaptors 212. The architectural layout of the computing system 200 enables the dynamic association of actions with entities, since actions are no longer an integrated part of an entity. Such a computing system 200 also provides a platform for a method that provides contextual information about actions associated with an entity in different contexts. FIGS. 6A-6C illustrate one exemplary implementation of such a method and will be discussed in detail later.

The computing system 200 further contains a software component 214. The software component 214 informs a client application 120 using an entity about what actions are associated with the entity in its current context. In the present invention, a context is a piece of information that captures data about the environment in which an entity is used. An entity may have one or more contexts. For example, an entity may have a context for capturing information about the client application 120. The entity may also have a context that captures information about the role of the user that is using the entity. The entity may further have a context that captures information about the entity itself. For example, a "customer" entity may simultaneously have three contexts: an entity context that captures the information about the "customer" entity itself, providing information such as customer ID; a role context that provides the identity of the user; and an application context that identifies the client application 120 that is using the entity.

In one exemplary embodiment of the invention, the software component 214 contains two modules: a context provider 216 and an action provider 218. As described in more detail below with respect to FIG. 3, the context provider 216 provides information about the working environment, i.e., the contexts in which an entity is operated on by a client application 120. The action provider 218 provides information about what actions are associated with an entity in its current contexts.

In some embodiments of the present invention, the software component 214 further includes a set of context resolvers 220. A context resolver 220 translates a context into a keyword. The action provider 218 uses the keywords provided by context resolvers 220 to construct a query. The action provider 218 sends the query to the action metadata store 210 to find the actions that are annotated with the keywords.

Figure 3:
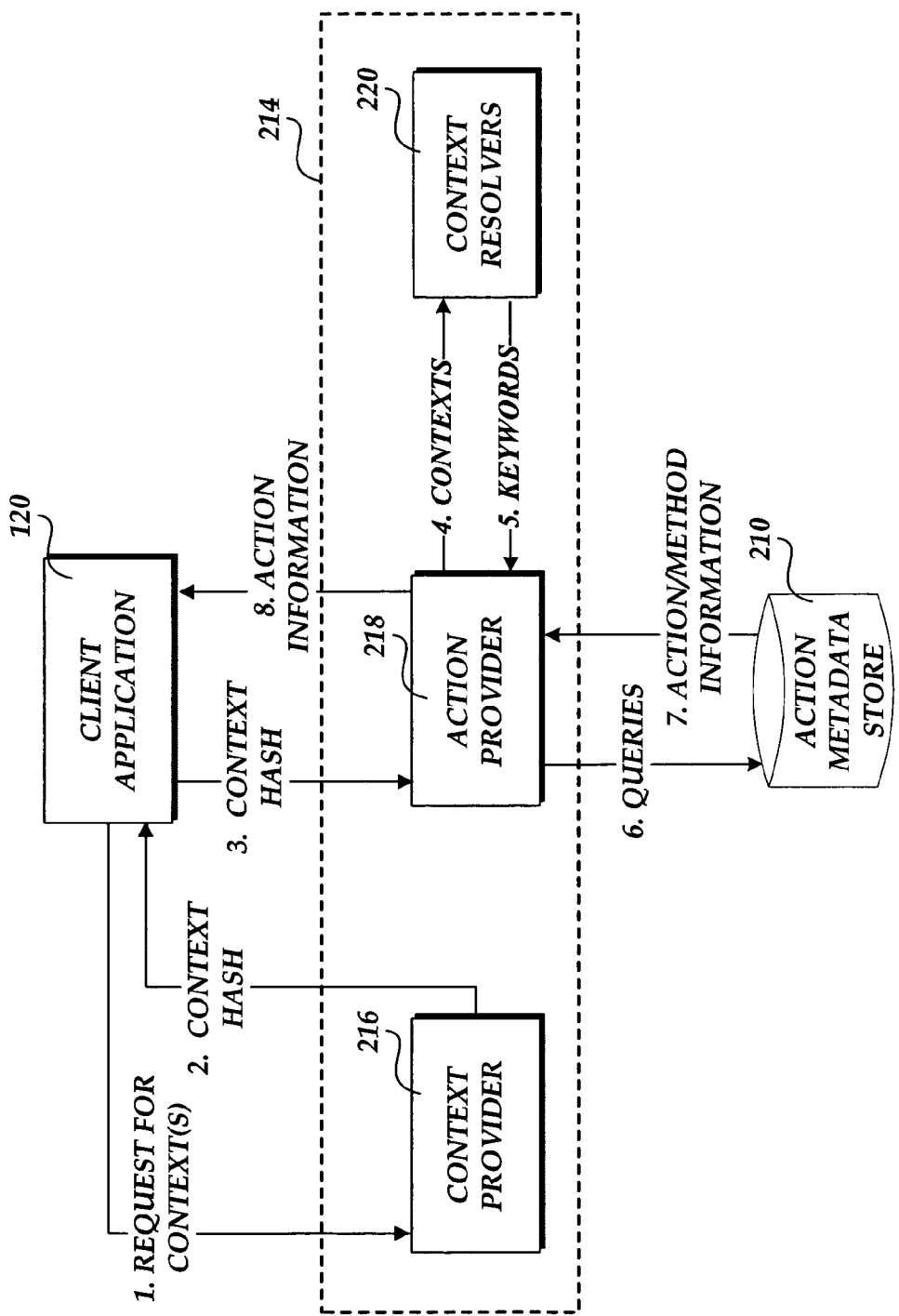
FIG. 3 is a block diagram illustrating the path of data flow in one exemplary embodiment of the present invention.

FIG. 3 illustrates a data flow path in one exemplary implementation of the present invention, using the computing system 200 illustrated in FIG. 2. Here, a client application 120 sends a request for all installed contexts of a particular entity. The client application 120 may initiate such a request upon a user showing interest in the entity, for example, by selecting the entity and issuing a command to observe the actions associated with this entity. In some embodiments of the invention, the client application 120 sends the request to the software component 214, specifically to the context provider 216 of the software component 214.

In this exemplary embodiment of the invention, the context provider 216 obtains information on the installed contexts of the entity. The context provider 216 then creates object instances of all the installed contexts. The context provider 216 then creates a ContextHash object, which contains the object instances of all the installed contexts of the entity. The context provider 216 then returns the ContextHash object to the client application 120 that requested the contexts.

The client application 120 may pass the ContextHash object to the action provider 218 in the software component 214. The action provider 218 traverses the ContextHash object to generate a query concerning actions associated with the installed contexts included in the ContextHash object.

In some embodiments of the present invention, the software component 214 also contains a set of context resolvers 220. Each context has a corresponding context resolver 220. A context resolver 220 takes a context and translates it into a keyword that can be used to locate actions associated with this context. A keyword is an annotation on a metadata such as an action that can be used to query this action from the action metadata store 210. In these embodiments, the action provider 218 passes the installed contexts to their corresponding context resolvers 220. The context resolvers 220 translate the installed contexts into their corresponding keywords and return the keywords to the action provider 218.

After receiving information about the installed contexts, the action provider 218 sends queries to the action metadata store 210 and retrieves actions associated with the installed contexts. In embodiments of the invention where context resolvers 220 are used, the queries that the action provider 218 sends to the action metadata store 210 also contain the keywords provided by the context resolvers 220. The action metadata store 210 locates all actions associated with the keywords.

The action metadata store 210 then passes the list of actions back to the action provider 218, which passes the information back to the client application 120 that requested information on the contexts and actions associated with an entity in these contexts. The client application 120 may do various things with the actions. For example, the client application 120 may publish the actions in an actions Menu associated with the entity.

In one exemplary embodiment of the present invention, the software component 214 is a library of classes. The classes are implemented as managed code classes, i.e., the classes are executed by a common language runtime environment such as Microsoft® .NET universal runtime. The classes can also be implemented as unmanaged code, i.e., the classes are executed directly by the operating system.

Figure 4:
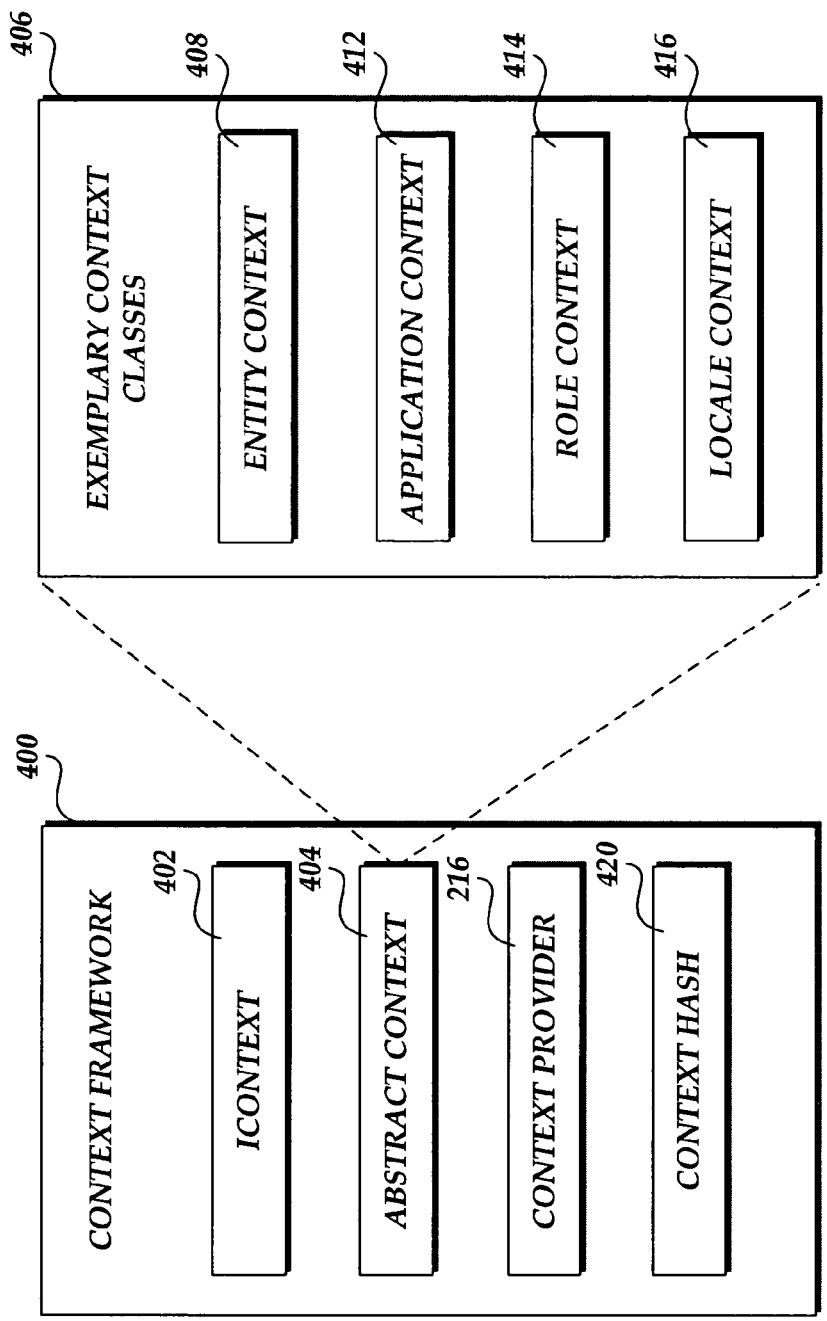
FIG. 4 is a block diagram illustrating one exemplary implementation of a context framework, which is a component of an exemplary embodiment of the present invention, and an example of context classes.
Figure 5:
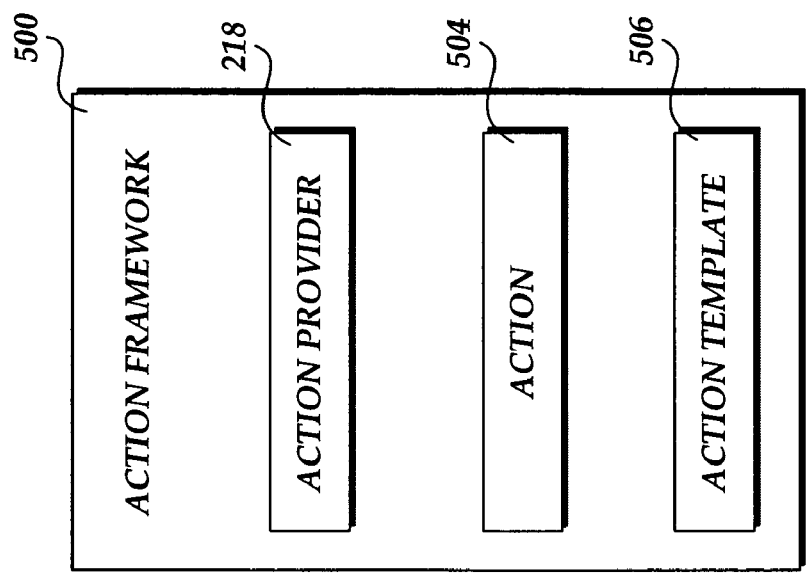
FIG. 5 is a block diagram illustrating one exemplary implementation of an action framework, another component of an exemplary embodiment of the present invention.

FIG. 4 and FIG. 5 illustrate one exemplary embodiment of a software component 214 containing a context framework 400 and an action framework 500. The context framework 400 illustrated in FIG. 4 contains classes that host context-related information. For example, IContext 402 is an interface that all context classes implement. In one embodiment of the present invention, IContext 402 has a Create( ) method. This method creates a new context of a given type. This method holds all the necessary details about the environment of an entity. In some embodiments of the invention, IContext 402 also contains a GetResolver( ) method, which returns a context resolver 220 object for a context.

The context framework 400 further contains an AbstractContext class 404. This class is an abstract base class that holds all common logic for all contexts.

In one exemplary implementation of the invention, context classes 406 derived from the AbstractContext class 404 are provided. FIG. 4 illustrates exemplary context classes 406. The illustrated exemplary context classes 406 include an EntityContext class 408 which holds data about what entity a user is currently dealing with. The EntityContext class 408 contains a Create( ) method. This method tries to find entity data from various sources. A source can be a current Web page. For example, if the user is running on MYSITE, this exemplary embodiment of the present invention assumes that the primary entity is the user profile of the owner of this MYSITE. Another source can be the query strings that are used to pass around information about the current entity. The Create( ) method can take the query string and extract the class name and object key from it. The EntityContext class 408 may also include a GetEntityObject( ) method. This method returns an entity object constructed based on the stored class and object key data. The EntityContext class 408 may also contain class fields that return the stored class name.

Another exemplary context class is ApplicationContext 412. An entity may have different actions in different types of client applications 120. For example, a user may want different actions showing up for an entity in a Web-based application as opposed to the same entity in an office client application. ApplicationContext class 412 stores information about the current client application 120. ApplicationContext.Create( ) identifies the client application 120 and then stores this information.

Another exemplary context class is RoleContext 414. This class holds data on the role of the user. In embodiments of the invention, RoleContext.Create( ) checks the identity of the current thread, draws certain conclusions on what roles the user belongs to, and stores the role information internally. For example, the user can be in the role of an administrator for the client application 120.

Embodiments of the invention may include another exemplary context class, the LocaleContext class 416. This class stores information about the current locale when the action depends on the current language of the application. Other embodiments of the invention may include additional context classes.

The context framework 400 further contains a ContextProvider class 216. An object instance of the ContextProvider class 216 can be used as an aggregator if a user wants to get all the available contexts associated with an entity. Preferably, the ContextProvider class 216 includes a GetContexts( ) method. In an exemplary embodiment of the invention, a list containing the installed contexts of an entity is provided. The GetContexts( ) method goes through this list of installed contexts, calls the Create( ) method on all of them, and returns a ContextHash object containing the resultant object instances of the installed contexts. In the case where a client application 120 may only need to use an individual context, the individual context is obtained by calling the corresponding Context.CreateOpen( ) method. In the case where a client application 120 needs to get all the available contexts associated with an entity, the client application 120 can call ContextProvider.GetContexts( ).

In the illustrated exemplary embodiment of the invention, the context framework 400 further contains a ContextHash class 420. The ContextHash class 420 may simply be a wrapper around a hash table, which contains a set of contexts. The ContextHash class 420 may include an item [type, key] property that allows access to individual contexts by their type.

As illustrated by FIG. 5, the software component 214 further contains an action framework 500. In the exemplary embodiment of the invention described herein, actions are metadata objects that encapsulate information about a certain activity and how the activity should be presented to the user. Such an activity can be, for example, creating a "customer" entity in a data management system, such as SAP. An action metadata object usually stores two main pieces of data. One is a display method that presents the action to a user. This display method can return a string such as "added in SAP" or do something more elaborate such as constructing a complex hyperlink. The other piece of data contained by an action is an execution method that actually performs the action. For example, the execution method can set up a new customer for a "customer" entity.

An important class in the action framework 500 is the ActionProvider class 218. As noted in the above discussion regarding FIGS. 2 and 3, the ActionProvider class 218 takes a set of contexts and returns lists of actions associated with these contexts. In the illustrated exemplary embodiment of the invention, the ActionProvider class 218 implements a GetActions( ) method. This method takes a ContextHash object containing the object instances of installed contexts and returns the list of actions associated with these contexts. In one embodiment of the invention, the GetActions( ) method walks the ContextHash object to enumerate all the contexts. It then calls a GetResolver( ) method on all the contexts to obtain their corresponding context resolvers 220. The GetActions( ) method then queries all context resolvers 220 to obtain the keywords reflecting the installed contexts. The GetActions( ) method then queries the action metadata store 210 to retrieve actions that are annotated with the keywords.

Certain actions are retrieved when a user of the entity is in several contexts at once. For example, a user of the "customer" entity who acts as an administrator may be simultaneously in both the "customer" entity context and the "administrator" role context. Thus, the GetActions( ) method may query the action metadata store 210 to retrieve actions that are annotated with both the "customer" keyword and the "administrator" keyword. In embodiments of the invention, an action would be returned only if it is annotated by both the "customer" keyword and the "administrator" keyword, and not by any other keywords. On the other hand, certain actions are retrieved if they are associated with one of the installed contexts. For example, a client application 120 may request actions associated with the "customer" entity context. Thus, the GetActions method queries the action metadata store 210 to retrieve actions that are annotated with the "customer" keyword. An action may be returned as long as it is annotated with the "customer" keyword, though it may be annotated by other keywords. In the illustrated exemplary embodiment of the present invention, to determine whether an action to be retrieved should be associated with one context or multiple contexts, the action metadata store 210 has a CombinationMode field. If this field is set to ALL, this action is only returned upon a query if the keywords annotating this action include all the keywords in the query sent by the GetActions( ) method. If the CombinationMode field is set to be ANY, an action is retrieved if it is annotated with at least one of the keywords in the query sent by the GetActions( ) method.

In the illustrated exemplary embodiment of the present invention, the query done by the GetActions( ) method is done in two phases. First, the method gets all actions whose CombinationMode is set to "ALL" and for which the keywords in the query provided by the GetActions( ) method are all the keywords annotating the action. Secondly, the GetActions( ) method gets all actions whose CombinationMode is set to "ANY" and for which the keywords in the query provided by the GetActions( ) method have at least one of the keywords annotating the action. The GetActions( ) method then combines the results of the two phases and returns the resultant list of actions.

The action framework 500 also contains an Action class 504. In embodiments of the present invention, the Action class 504 is the managed code representation of the action metadata. The Action class 504 contains a GetDisplayMethod( ). This method returns the method that displays the action. This method is expected to return a string, such as "Edit Customer in SAP," or do something more elaborate, such as constructing a hyperlink. The Action class 504 also contains a GetExecuteMethod( ), which returns the method for actually performing the action. If the GetDisplayMethod( ) returns a hyperlink, the action might not have an execution method at all; in this case, GetExecuteMethod( ) returns null. The Action class 504 may also contain a GetActionTemplate( ), which returns the action template of the action.

In some embodiments of the present invention, the action framework 500 may also contain an ActionTemplate class 506. In some situations, if there are existing methods that can be used for an action, then not all the information needs to be extracted from the ContextHash object generated by the Context Provider 216. Only the necessary information for the parameters of the existing methods needs to be extracted. In these situations, ActionTemplate class 506 acts as a translator. It takes a ContextHash object, extracts from it necessary information for the parameters of the existing methods, and passes the information on to the existing methods. The ActionTemplate class 506 has one method called Execute( ). This method takes a ContextHash object and a method description, parses the contexts in the ContextHash object to find the right parameters for the method, and executes the method. One ActionTemplate 506 can be used for multiple methods having a common characteristic, such as what they do. Each group of methods can have an ActionTemplate 506 that knows how to get the correct parameters from a ContextHash object.

Consequently, when executing a method, the invention enables a client application 120 to either call Method.Execute( ) directly and pass the ContextHash object to it, or call ActionTemplate.Execute( ) and pass it a description of the method and the ContextHash object.

In the illustrated exemplary embodiment of the present invention, the software component 214, as illustrated in FIG. 3, may further contain a set of context resolvers 220, each of which corresponds to one context. Context resolvers 220 translate contexts into sets of keywords. The keywords can be used in the query for miscellaneous metadata from the action metadata store 210. In some embodiments of the present invention, the context resolvers 220 may contain an interface called IContextResolver. This is an interface that all context resolvers 220 have to implement. It has the ResolvetoQuery( ) method that takes a context and returns a dictionary of key-value pairs.

In some embodiments of the present invention, the software component 214 may be expanded by custom contexts and context resolvers that are built by third parties. A simple registration mechanism may be provided where the third party can provide information about their contexts. In some embodiments of the present invention, third parties can also add new actions by providing the logic for executing their methods, and setting up actions in the action metadata store 210 and associating keywords with the actions.

In embodiments of the present invention, in order to make the execution of the context provider 216 and the action provider 218 transparent in terms of application performance speed, the context provider 216 holds onto the contexts it has created for its lifetime. In such a way, a Web page can create a context provider 216 object when it is loaded, and all of the Web Parts can get their contexts from this object, reusing the context objects of previous Web Parts. In addition, the action provider 218 uses application registry metadata caching. In this way, the system does not need to do any repeated trips to the action metadata store 210 to retrieve the needed action lists.

FIGS. 6A-6C illustrate one exemplary method 600 for contextual action publishing. This method 600 is described with reference to the computing system 200 illustrated in FIG. 2. The method 600 first finds the contexts an entity is in, using the context provider 216. The method 600 then locates all the actions that correspond to these contexts, using the action provider 218. The client application 120, in which the entity is being used, may then display the set of actions that a user can perform on the entity in the contexts.

Upon receiving a request, i.e., from a client application 120, for a list of installed contexts for an entity (see block 602), the method 600 executes a process 604 that provides context information by creating a ContextHash object containing the object instances of the installed contexts. See block 604. FIG. 6B illustrates one exemplary implementation of the process 604 and will be discussed in detail later. After executing the process 604, the method 600 may receive a request, i.e., from the same client application 120 that has requested the installed contexts, for the actions associated with the installed context objects in the ContextHash object. See block 620. The method 600 then executes a process 622 to construct a query against the action metadata store 210 and retrieve all the actions associated with the installed context objects in the ContextHash object. See block 622. FIG. 6C illustrates one exemplary implementation of the process 622 and will be discussed in detail later. After executing the process 622, the method 600 terminates.

FIG. 6B illustrates one exemplary implementation of the process 604 for providing installed contexts associated with an entity. The process 604 first tries to obtain information about the installed contexts associated with the entity. See block 606. In one embodiment of the invention, the process 604 opens a configuration file that contains information about the installed contexts. For example, if the installed contexts are the entity context and the role context, this configuration file would contain class information for the entity context and the role context. The process 604 then walks through the list of installed contexts in the configuration and creates object instances of these installed contexts. See block 608. For example, the process 604 may call EntityContext.Create( ) and RoleContext.Create( ) to create an EntityContext object instance and a RoleContext object instance. The EntityContext class may parse the URL it receives and find that it is supposed to create an instance of a "customer" class, with a customer ID of 255. The EntityContext class calls Class.GetClass ("customer") to get a handle to the customer class. The EntityContext class then calls the Class.Instantiate(255) to create the correct "customer" object instance. The EntityContext class then returns the EntityContext object instance. Meanwhile, the RoleContext class checks the current user's identity and finds that the user is an administrator. The RoleContext class stores the role (administrator) information and retains a RoleContext object instance. The process 604 then creates a ContextHash object and puts the created object instance of installed contexts into this ContextHash object. See block 610. For example, the process 604 can put the EntityContext and RoleContext object instances created above into the ContextHash object. The process 604 then returns the resultant ContextHash object. See block 612.

FIG. 6C illustrates one exemplary implementation of the process 622 for retrieving actions associated with the entity in the installed context. The process 622 walks through the ContextHash object created by process 604 and calls the proper context resolver 220 for each of the installed contexts. See block 624. For example, the process 622 may get back an EntityContextResolver and a RoleContextResolver, if the EntityContext and the RoleContext object instances are what the ContextHash object contains. The context resolvers 220 return keywords reflecting these installed contexts. See block 626. For example, an EntityContextResolver returns a keyword "customer" if the entity is a "customer." A RoleContextResolver returns a keyword "administrator" if the role of the user is an administrator. The process 622 then constructs a query containing these keywords against the action metadata store 210 to retrieve actions that are annotated with these keywords. See block 628. For example, the process 622 may construct a query containing the keywords "customer" and "administrator." The process 622 then retrieves a list of actions and returns it from the action metadata store 210. See block 630.

The client application 120 that has made the requests for the installed contexts and the actions associated with these installed contexts may proceed to use the actions returned by the method 600. The client application 120 may use the actions for any purpose. In some embodiments of the present invention, the client application 120 displays the actions in an actions Menu so a user may be informed about what the user can do with the entity. The user may proceed to execute the actions by selecting them in the actions Menu. Further discussion of the actions Menus will be provided later, in association with the description of FIGS. 12-13.

The invention further provides multiple user interfaces for managing and accessing actions associated with an entity. FIGS. 7-10 illustrate one exemplary implementation of a user interface 700 for managing actions associated with an entity. In this example, a user acts as an administrator. Through the user interface 700, an administrator creates and modifies actions associated with an entity. The administrator can also manage an actions Menu that displays actions associated with an entity in one or more contexts.

In an exemplary embodiment of the invention, the user interface 700 is situated within the application registry administration pages, which are part of Microsoft® Shared Resource Provider administration program. The user interface 700 can be reached by an administrator going to the application registry administration program, selecting a client application 120, and clicking on an entity. This opens up an Edit Entity page. The actions section of the Edit Entity page allows an administrator to add and/or edit actions, and to specify which actions appear in the actions Menu and in what order. If an entity has no actions associated with it, the actions section of the Edit Entity page shows that this entity has no actions.

Figure 7:
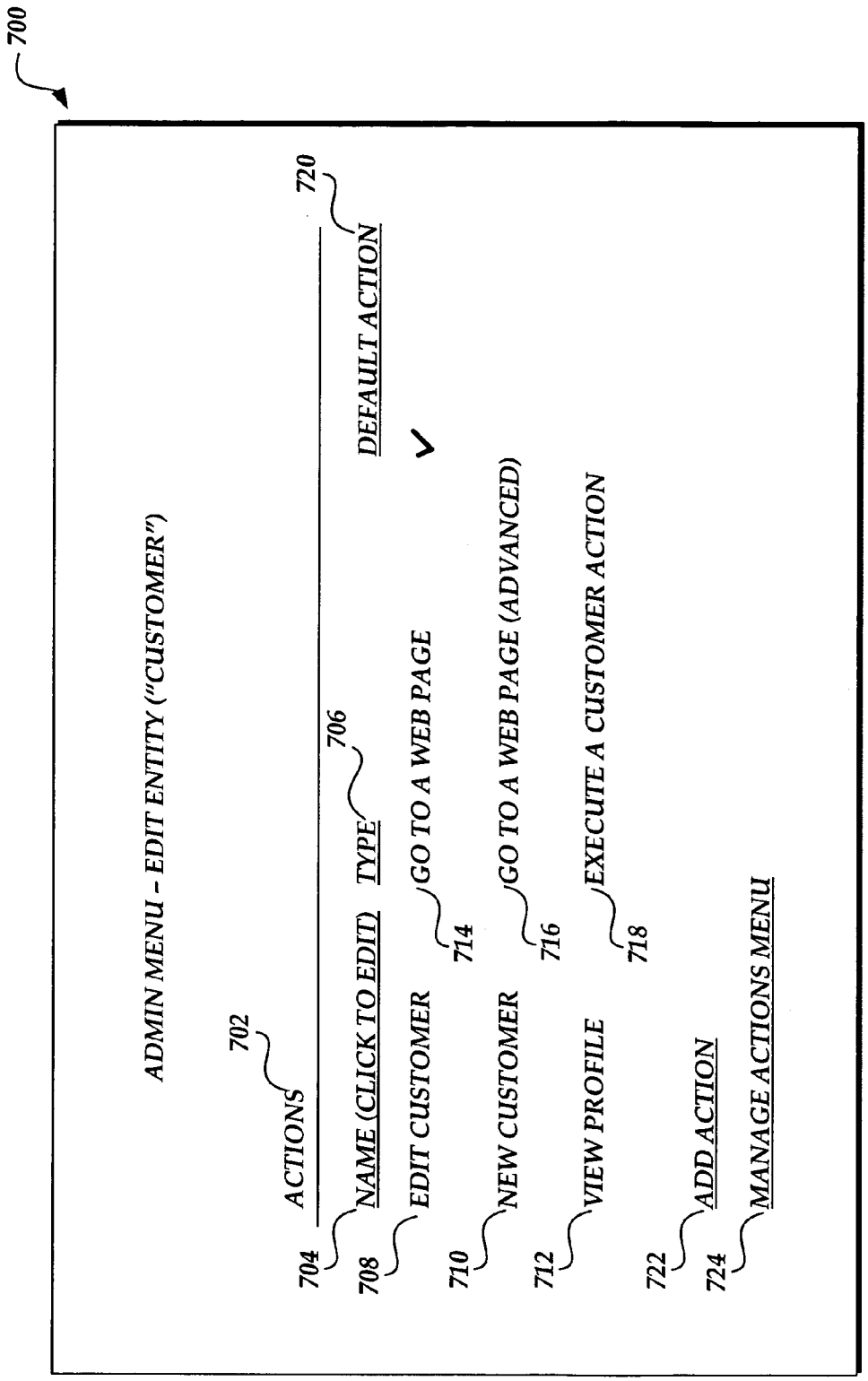
FIGS. 7-10 are pictorial diagrams illustrating one exemplary implementation of administrative pages for managing the actions associated with an entity.

As shown in FIG. 7, in the illustrated exemplary embodiment of the invention, the user interface 700 identifies the actions 702, if any, associated with an entity. The user interface 700 further identifies the action name 704. For example, FIG. 7 illustrates three actions 702 associated with a customer entity: an "edit customer" action 708, a "new customer" action 710, and a "view profile" action 712. The user interface 700 also identifies the action type of each action. The action type of an action indicates what will happen if the action is selected. For example, in FIG. 7, the user interface 700 displays the action type 706 associated with each of these three actions: go to a Web page 714, go to a Web page (advanced) 716, and execute a customer action 718, respectively. The user interface 700 illustrated by FIG. 7 also indicates which one of the actions displayed is a default action 720. For example, FIG. 7 shows that the default action for the "customer" entity is the "edit customer" action 708.

As illustrated by FIG. 7, in the user interface 700, an administrator may edit an action by clicking on the action name 704. An administrator may also add an action by clicking on the "add action" link 722. An administrator may also manage the actions Menu associated with this entity by clicking on the "manage actions Menu" link 724.

Figure 8A:
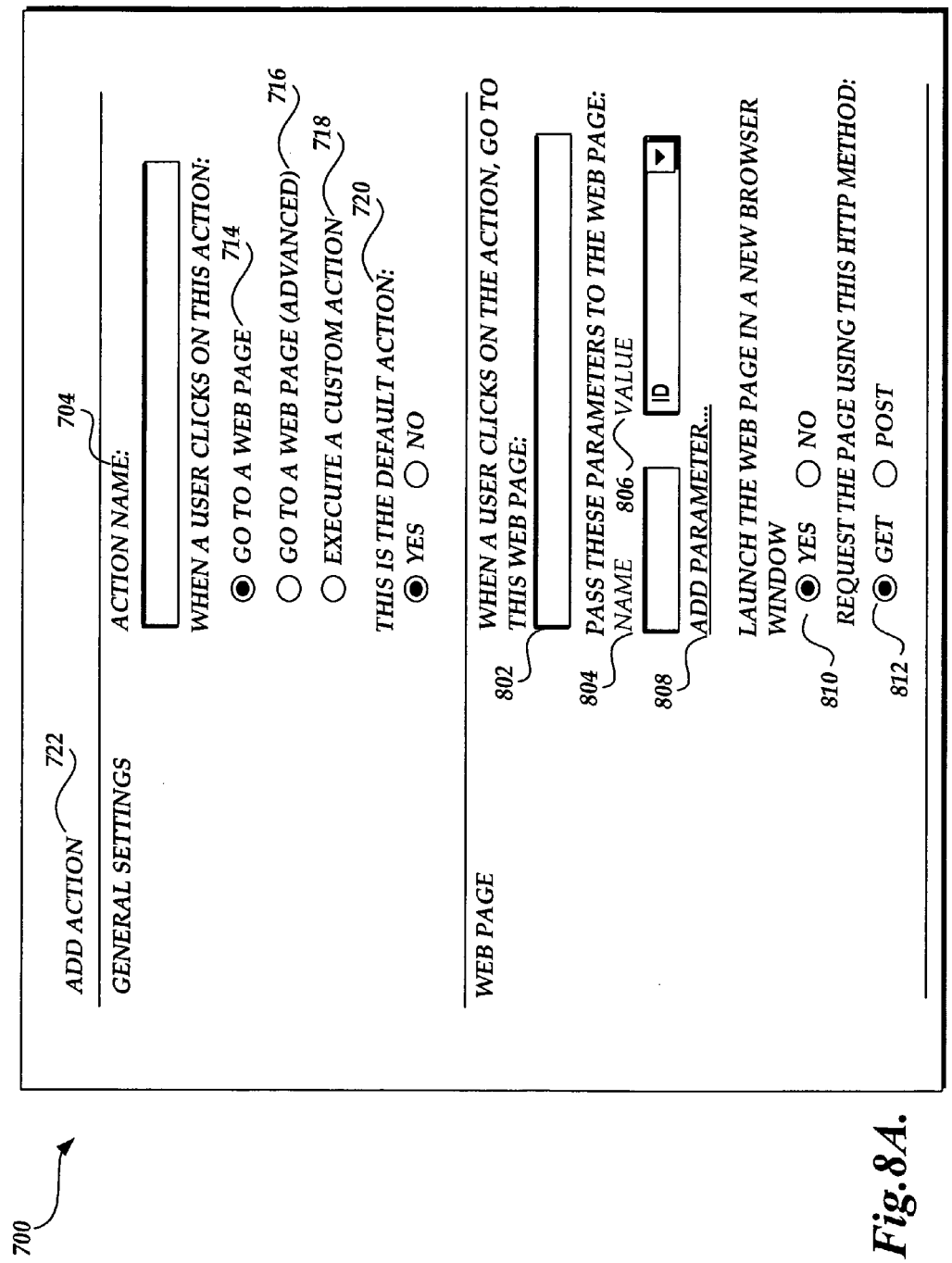

FIGS. 8A-10 are a continuation of the user interface 700 illustrated in FIG. 7. More specifically, FIGS. 8A-8C illustrate how the user interface 700 allows an administrator to add actions of different action types to a "customer" entity. For example, FIG. 8A illustrates how an administrator may add an action of action type "go to a Web page" 714. In one embodiment of the invention, actions of the type "go to a Web page" simply take a user to a URL, optionally passing entity data as query string parameters or post data. These actions are suitable for Web pages with URLs such as http://abc/def/def.asp?valueid=100. The user interface 700 first requests the administrator to specify the name of the action 704. The user interface 700 then asks the administrator to specify the action type 706 of the action. For example, in FIG. 8A, the administrator selects that the action type 706 of the action 704 is "go to a Web page" 714. The administrator also specifies that this action is a default action 720 for the entity.

The user interface 700 further asks an administrator to specify the location 802 of the Web page that a user will be taken to when the user actuates this action. The user interface 700 also asks the administrator to specify the name 804 and the value 806 of each parameter being passed to the Web page. The user interface 700 permits the administrator to pass multiple parameters to the Web page by using the "add parameter" link 808. The user interface 700 also allows the administrator to specify whether to launch the Web page in a new browser window by selecting a "Yes" or "No" button (see 810). For example, in the user interface 700 illustrated by FIG. 8A, the administrator selects to launch the Web page in a new browser window.

The user interface 700 may further request the administrator to specify whether to request the Web page using the "Get" or the "Post" HTTP method (see 812). For example, in the user interface 700 illustrated in FIG. 8A, the administrator selects to use the "Get" HTTP method to request the Web page. As those skilled in the relevant art and others will know, the "Get" HTTP method retrieves HTML documents from a Web server. Information from a form using the "Get" HTTP method is appended to the end of the action URL being requested. In general, the "Get" HTTP method should probably be used when URL access will not change the state of a database, for example, by adding or deleting information. On the other hand, if the URL access will cause a change in the database of the Web server, the "Post" HTTP method should be used. The "Post" HTTP method immediately transmits all input in the form off to the URL. The major advantage in using the "Post" HTTP method over the "Get" HTTP method is that the data is not open to prying eyes. Also, via the "Get" HTTP method, one can transfer only a limited amount of data, while the "Post" HTTP method exerts no such limitations.

Figure 8B:
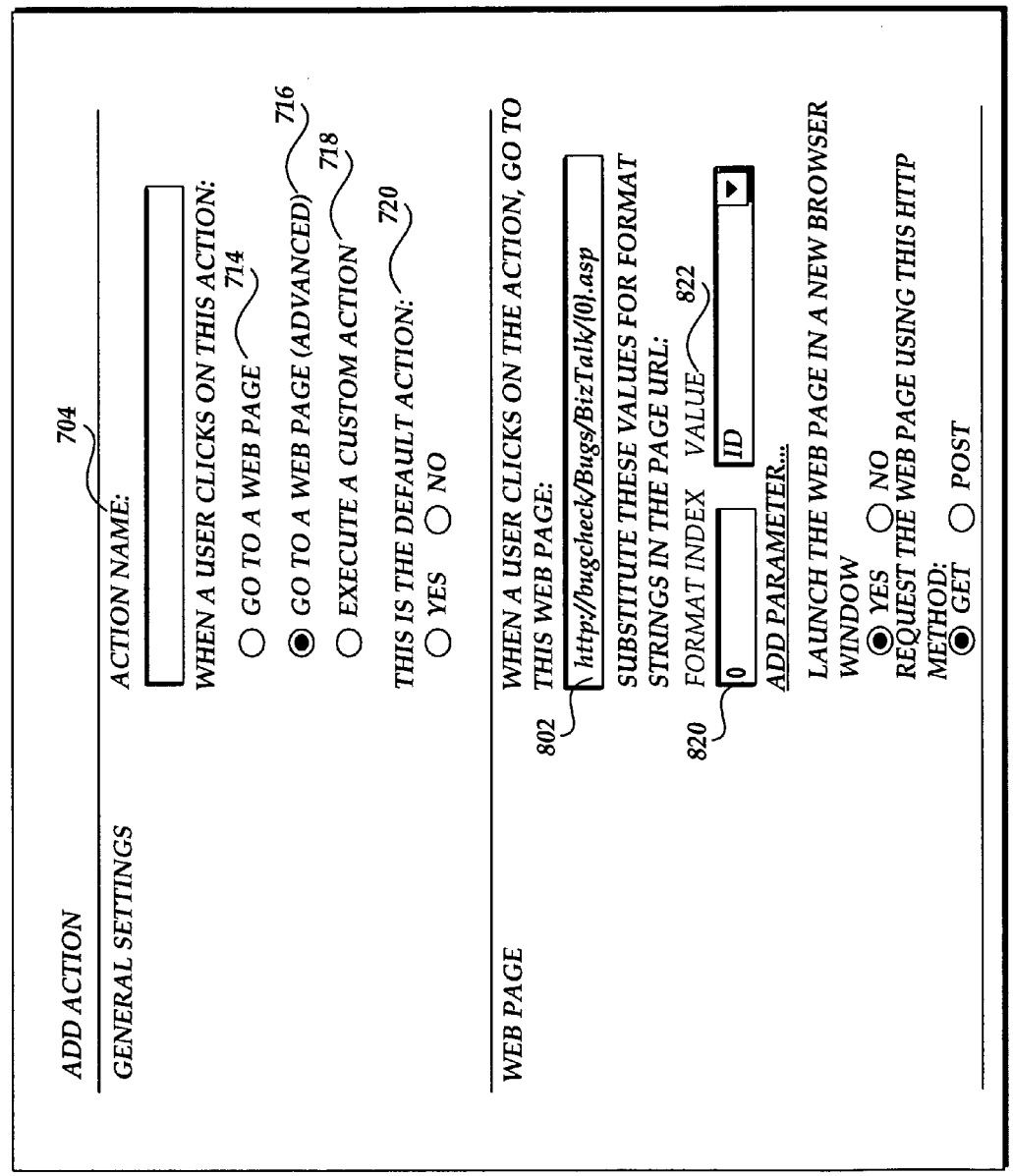

FIG. 8B illustrates the user interface 700 when an administrator selects to add an action of the action type "go to a Web page (advanced) 716." An action of this action type allows an administrator to insert parameters in the URL and to format them with the flexibility of Microsoft® .NET format strings. These actions work for Web pages like http://bugcheck/bugs/sps/100.asp. The user interface 700 illustrated by FIG. 8B is very similar to the user interface 700 for configuring an action of action type "go to a Web page 714" as illustrated in FIG. 8A. The major difference is that, after the administrator specifies a location 802 of the Web page, instead of specifying the name 804 and the value 806 of a parameter, as illustrated by FIG. 8A, the administrator specifies the format index 820 and value 822 for the format strings in the URL.

Figure 8C:
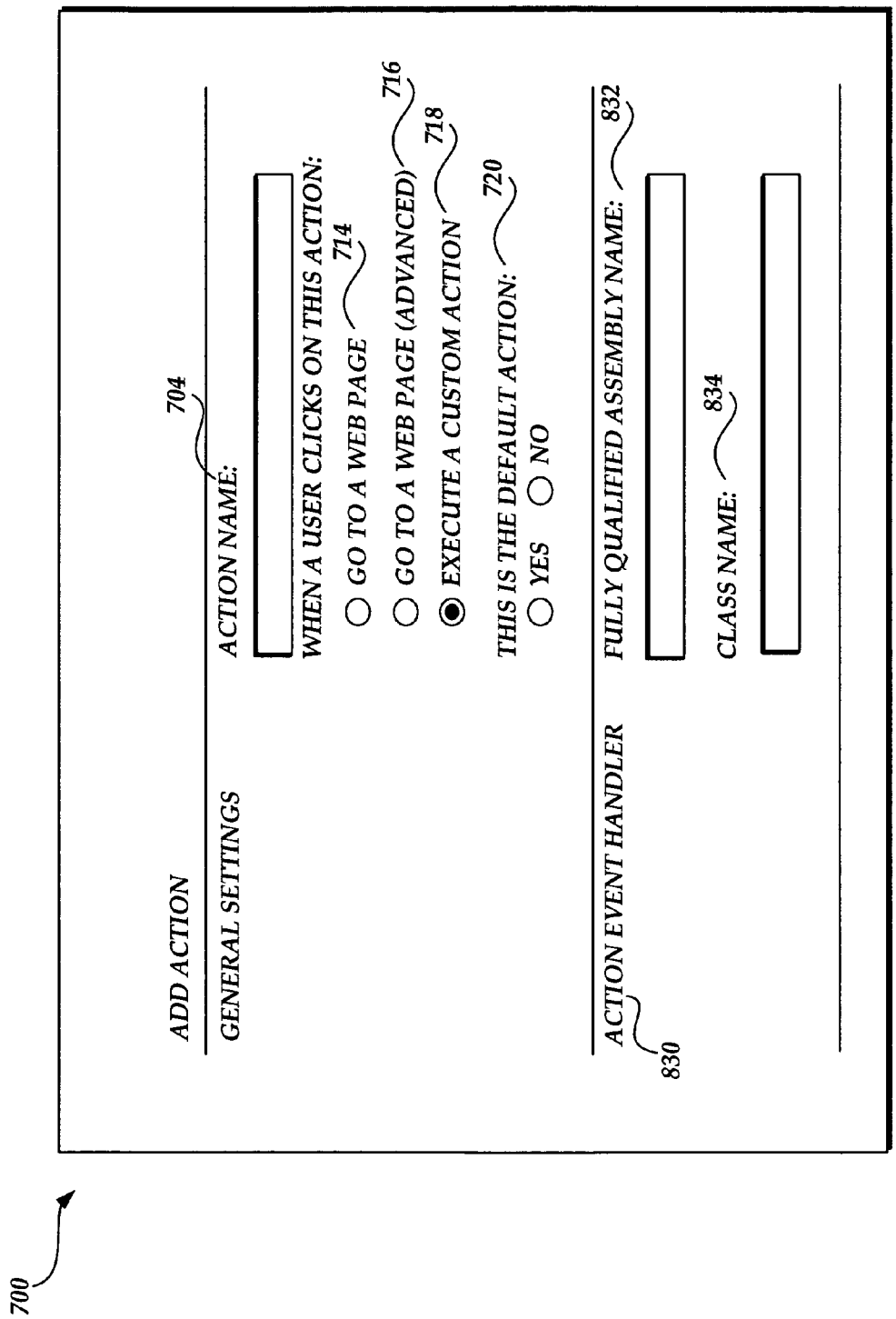

Embodiments of the invention may also allow custom actions provided by a third party. In some embodiments of the invention, custom actions execute code in a class that implements an interface such as IActionEventHandler. FIG. 8C illustrates the user interface 700 when the administrator chooses to add an action of the action type "execute a custom action 718." The user interface 700 asks the administrator to input information for the action event handler 830 associated with this action. In some embodiments of the invention, the administrator may need to provide the fully qualified assembly name 832 and the class name 834 for the action event handler.

In some embodiments of the invention, the user interface 700 may also allow an administrator to specify the locale associated with the action when adding an action. For example, the administrator may specify to associate the locale of "English (United States)" with the action of "view customer profile."

Figure 9:
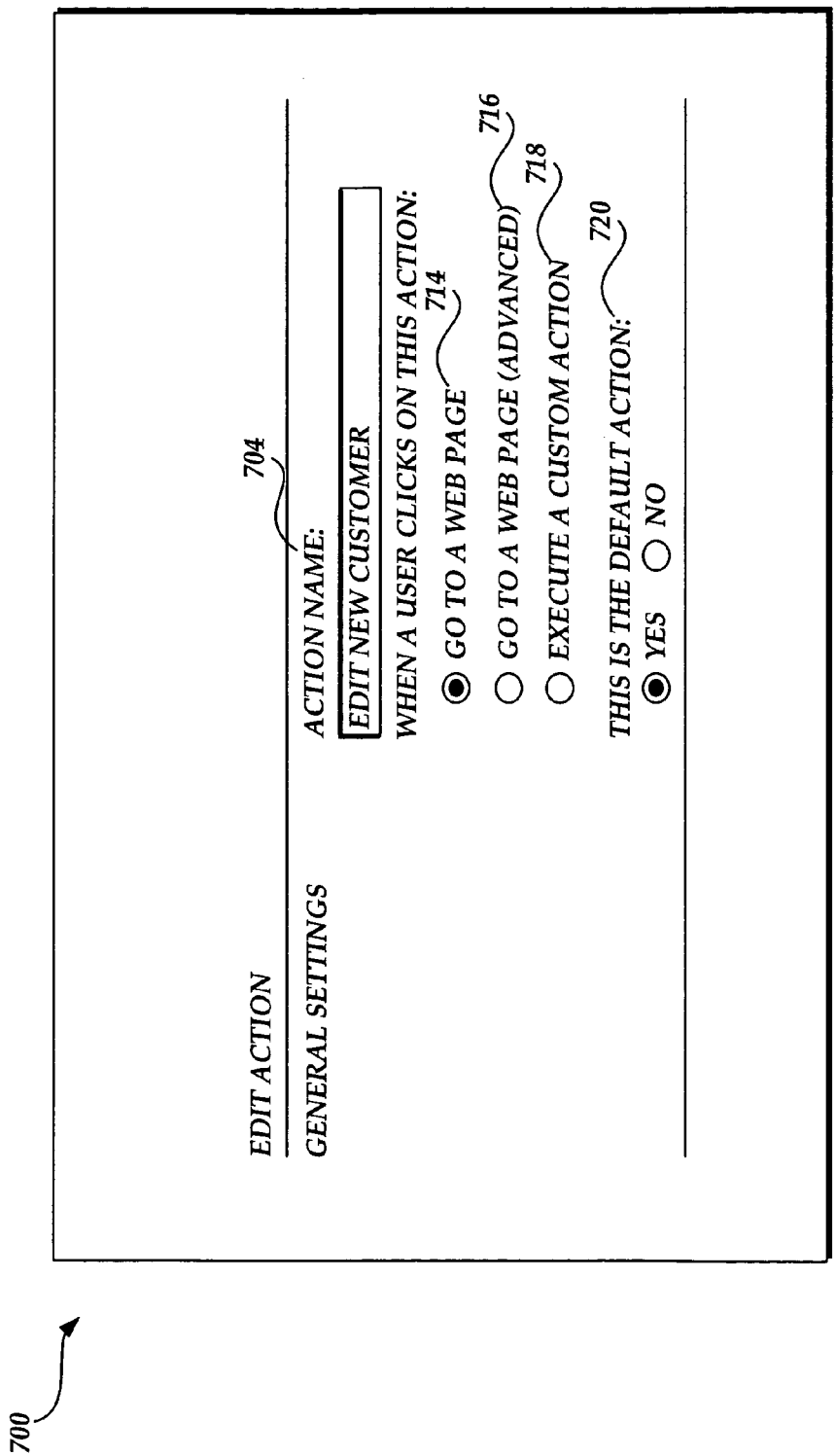

FIG. 9 illustrates one embodiment of the user interface 700 when an administrator clicks the name 704 of an action to edit the action, as indicated in FIG. 7. When editing an action, the administrator may change the name 704 of the action and/or the action type 706 of the action. The administrator may also specify whether this action is a default action 720. For example, in FIG. 9, the administrator modifies the action name 704 to be "edit new customer." The administrator also specifies the action type 706 of the action to be "go to a Web page 714." The administrator further specifies that this "edit new customer" action is to be the default action 720 when the "customer" entity associated with this action is actuated.

Figure 10:
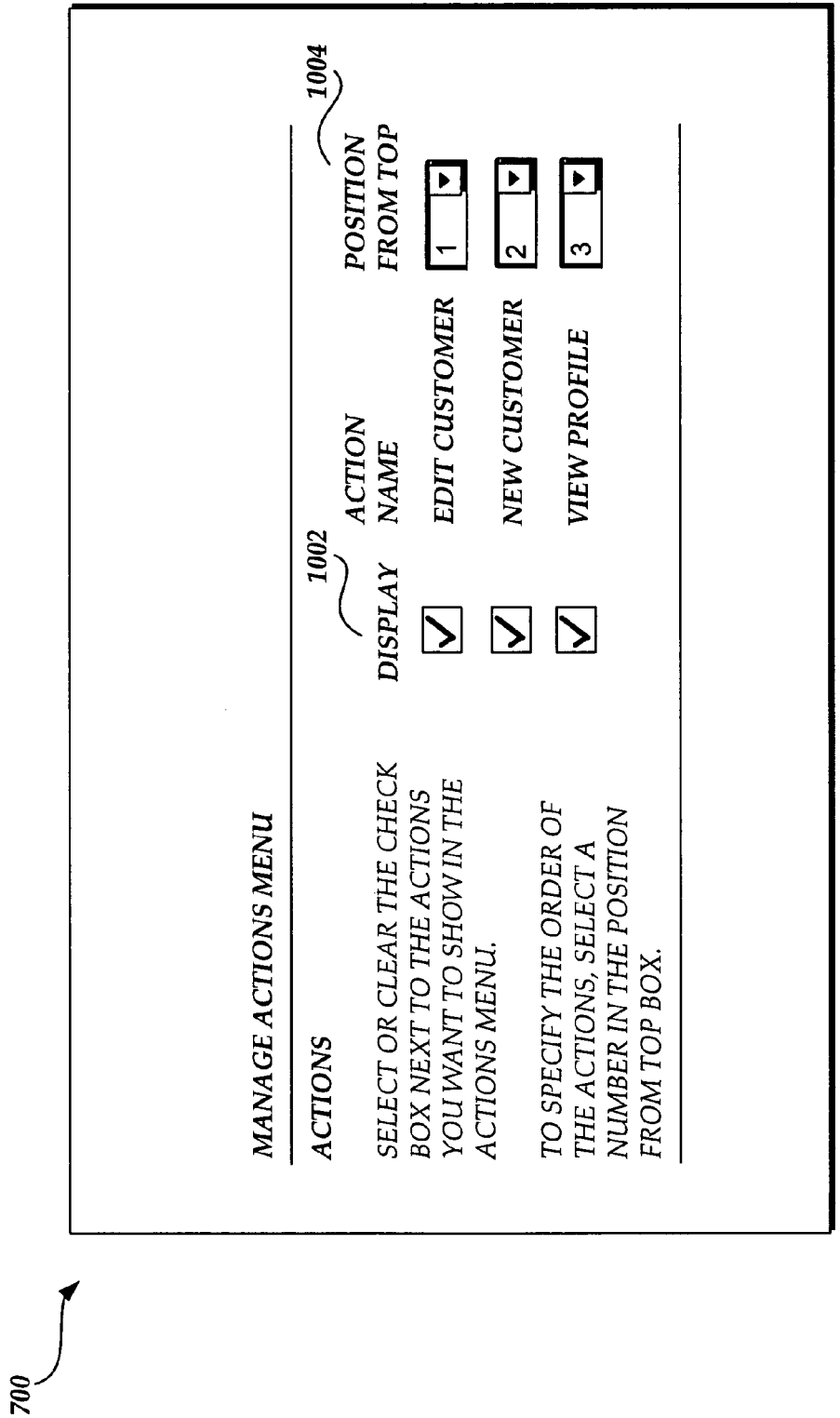

FIG. 10 illustrates the user interface 700 when an administrator actuates the "manage actions Menu" link 724 illustrated in FIG. 7. The manage actions Menu screen allows an administrator to control what actions show up in the actions Menu and in what order they appear. As illustrated in FIG. 10, an administrator may control what actions show up in the actions Menu by marking or clearing the display check box 1002 located next to the action. For example, in FIG. 10, the administrator selects to display all the three actions—edit customer, new customer, view profile—by marking all three display boxes located next to these actions. An administrator may also specify the order of these actions to be displayed in the actions Menu by selecting a number in the "position from top" box 1004. For example, in FIG. 10, the administrator selects to display the actions in the order of "edit customer," "new customer," and "view profile" by specifying their values in the "position from top" boxes 1004 to be 1, 2, and 3, respectively.

Figure 11A:
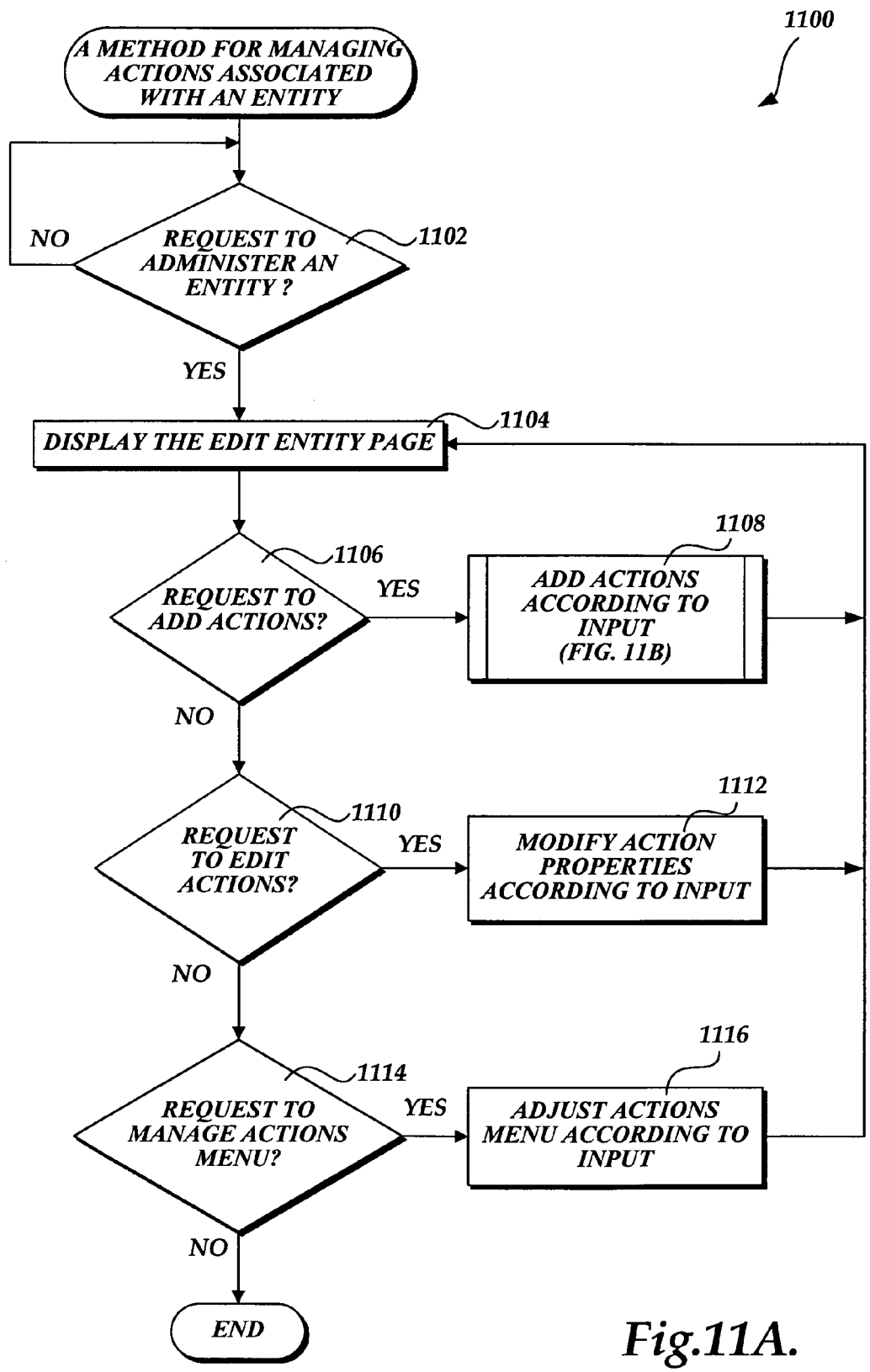
FIGS. 11A-11B are functional flow diagrams illustrating an exemplary method of administrating actions associated with an entity.
Figure 11B:
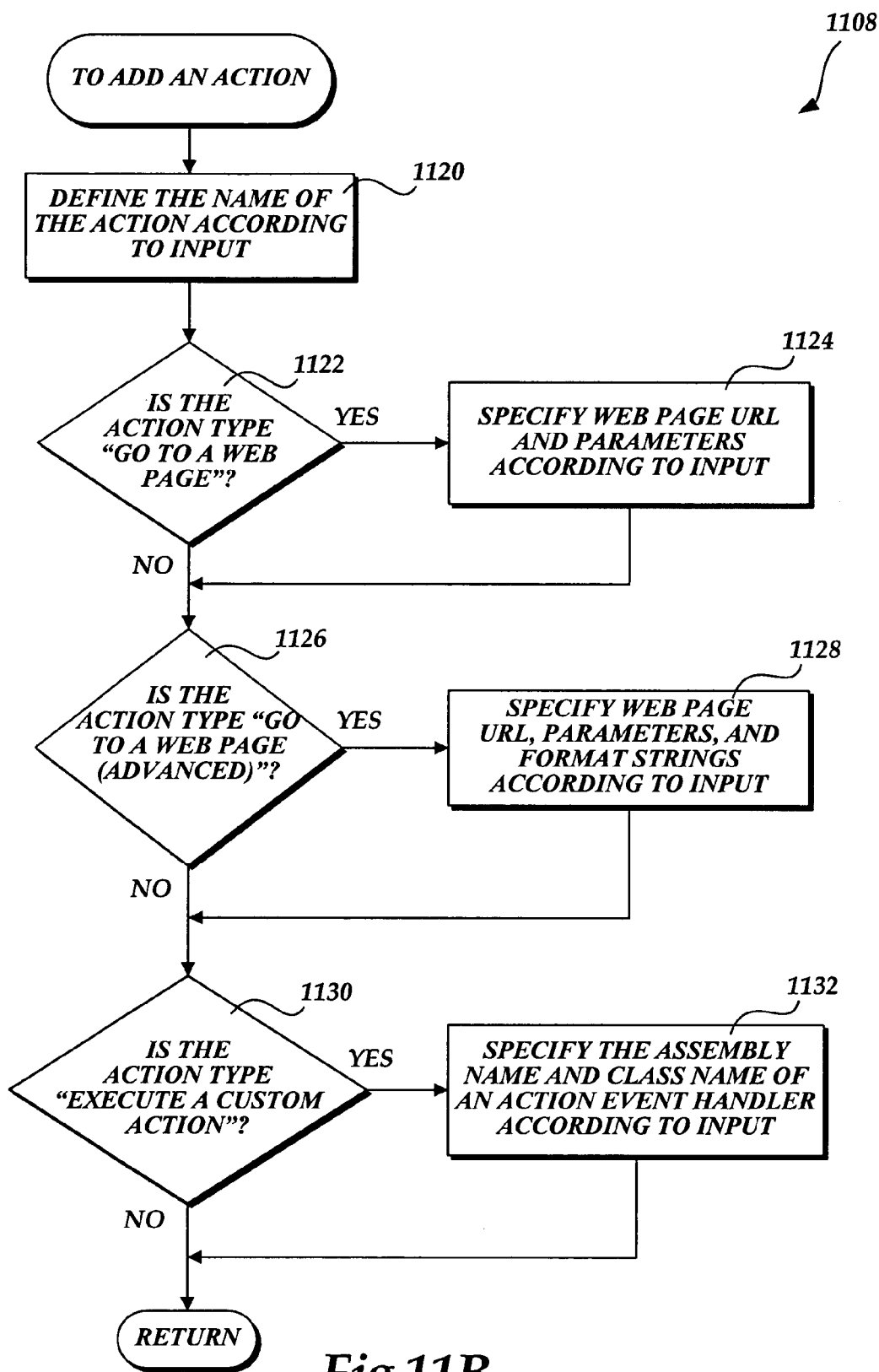

FIGS. 11A and 11B illustrate a method 1100 for managing actions associated with an entity. The method 1100 is described in reference to the user interface 700 illustrated in FIGS. 7-10. The method 1100 first checks to see if there is a request to administer the actions associated with an entity. See decision block 1102. If the answer is NO, the method 1100 does nothing. If the answer is YES, the method 1100 displays the Edit Entity page. See block 1104. The method 1100 then proceeds to check if a request has been made to add actions. See decision block 1106. If the answer to decision block 1106 is YES, the method 1100 proceeds to a process 1108 to add actions according to received input. See block 1108. FIG. 11B illustrates an exemplary implementation of the process 1108 and will be discussed in detail later. If the method 1100 receives a request to edit actions (see decision block 1110), the method 1100 proceeds to modify properties associated with the action according to received input. See block 1112. If the method 1100 receives a request to manage the actions Menu associated with the entity (see decision block 1114), the method 1100 proceeds to adjust the actions Menu according to received input. See block 1116. In embodiments of the invention, after adding actions, modifying actions, or adjusting the actions Menu according to received input, the method 1100 returns to display the Edit Entity page and waits for the next request. In the case that the method 1100 receives no request for a certain period of time, or receives a termination signal, the method 1100 terminates.

FIG. 11B illustrates one exemplary embodiment of the process 1108 for adding actions according to input. The process 1108 starts by defining the name of the action according to received input. See block 1120. The process 1108 then proceeds to check the action type of the action according to the received input. If the action type is of "go to a Web page" 714 (see decision block 1122), the process 1108 proceeds to specify the Web page URL and parameters according to received input. See block 1124. If the action type is of "go to a Web page (advanced)" 716 (see decision block 1126), the process 1108 proceeds to specify the Web page URL, parameters, and format strings according to received input. See block 1128. In the case that the action type is of "execute a custom action" 718 (see decision block 1130), the process 1108 proceeds to specify an assembly name and class name of an action event handler according to received input. See block 1132. The process 1108 then returns.

In the illustrated exemplary embodiment of the invention, an actions Menu containing the actions associated with an entity appears in a client application 120 that is using the entity. Such a client application 120 can be Microsoft® Sharepoint list or search results. As illustrated by FIG. 10, an administrator specifies which actions appear in the actions Menu and the order in which they appear. This same set of actions appear in every actions Menu in the sites associated with the application registry in which the edition by the administrator occurs.

Figure 12:
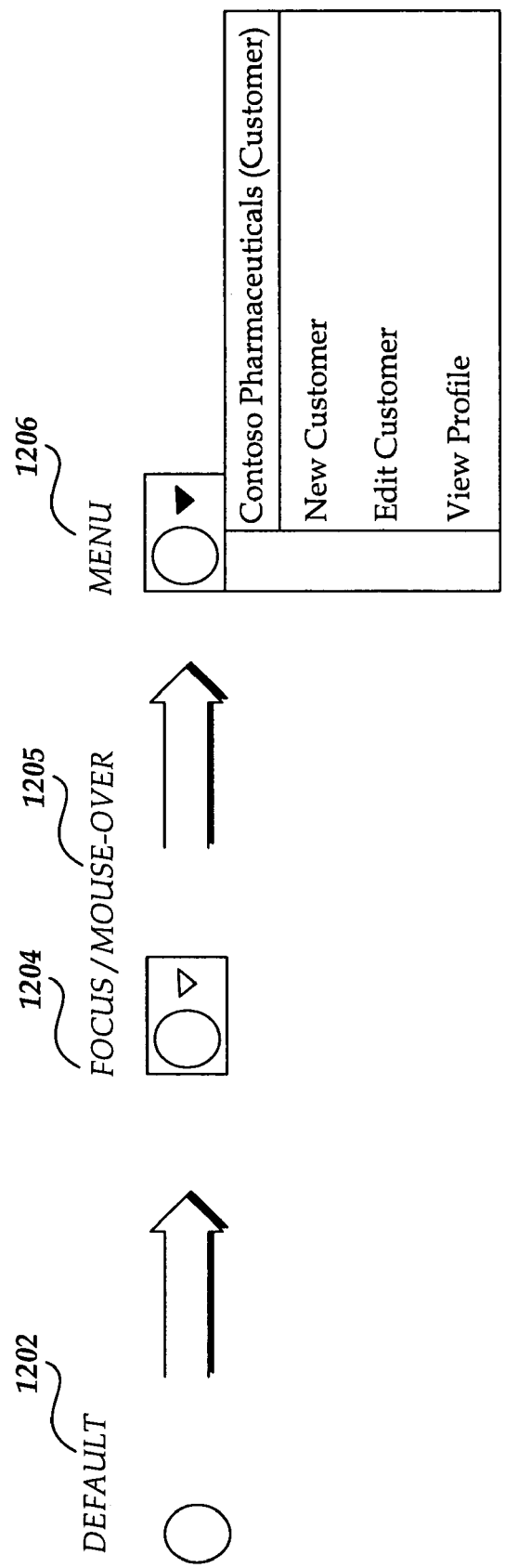
FIG. 12 is a pictorial diagram illustrating one exemplary process of activating an actions Menu.

FIG. 12 illustrates one exemplary way of activating an actions Menu in a client application 120 using the entity that the action menu is associated with. In the illustrated exemplary embodiment of the invention, an actions Menu has three states: a default state 1202, a focus 1204 or mouse-over state 1205, and a menu state 1206. As illustrated in FIG. 12, the actions Menu is in the default state 1202 when only the icon representing the actions Menu is displayed. The actions Menu is in the focus 1204 or mouse-over state 1205 when the icon representing the actions Menu is tabbed into focus or a pointing device such as a mouse moves over the icon representing the actions Menu. An actions Menu is in the menu state 1206 when the actions Menu is fully expanded and all the actions associated with the entity are displayed.

Figure 13:
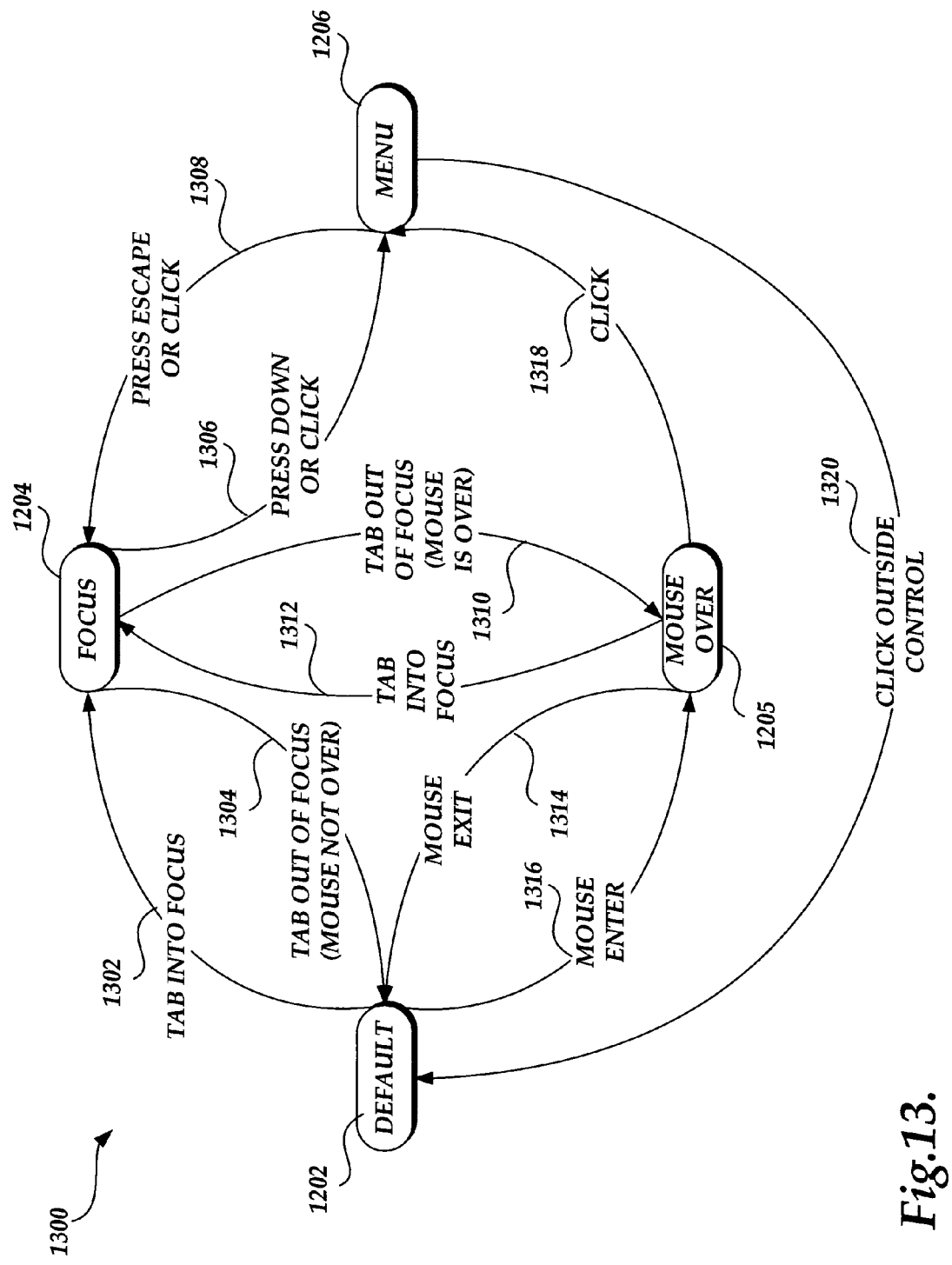
FIG. 13 is a state diagram illustrating how an actions Menu may be activated using a pointing device such as a mouse.

FIG. 13 illustrates one exemplary method of transitioning an actions Menu among the three states illustrated by FIG. 12. More specifically, FIG. 13 is a state diagram illustrating one exemplary method 1300 of transitioning an actions Menu among the three states illustrated in FIG. 12, using a pointing device such as a mouse. By tabbing the icon representing the actions Menu into focus, the method 1300 transitions the actions Menu from the default state 1202 into the focus state 1204. See route 1302. Conversely, the method 1300 transitions the actions Menu from the focus state 1204 back to the default state 1202 by tabbing the actions Menu out of focus when the mouse is not over the icon representing the actions Menu. See route 1304.

The method 1300 transitions the actions Menu from the focus state 1204 to the menu state 1206 when a user actuates the icon representing the actions Menu by pressing down or clicking on the icon. See route 1306. Conversely, the method 1300 transitions the actions Menu from the menu state 1206 back to the focus state 1204 when the user actuates the escape key on the keyboard or clicks on the fully extended actions Menu. See route 1308.

The method 1300 enables the transitions between the focus state 1204 and the mouse-over state 1205 by tabbing the icon representing the actions Menu into focus or out of focus. The icon representing the actions Menu transitions from the focus state 1204 to the mouse-over state 1205 when the icon is tabbed out of focus and the mouse is over the icon. See route 1310. Conversely, the method 1300 transitions the icon representing the actions Menu from the mouse-over state 1205 to the focus state 1204 by tabbing the icon into focus. See route 1312.

The method 1300 enables the icon representing the actions Menu to transition from the mouse-over state 1205 back to the default state 1202 by moving the mouse away from the area occupied by the icon representing the actions Menu. See route 1314. Conversely, the method 1300 transitions the icon from the default state 1202 to the mouse-over state 1205 when the mouse enters the area occupied by the icon representing the actions Menu. See route 1316.

The method 1300 transitions the icon representing the actions Menu from the mouse-over state 1205 into the menu state 1206 when a user clicks on the icon. See route 1318. The actions Menu collapses and transitions from the menu state 1206 back to the default state 1202 when a user clicks outside the area occupied by the actions Menu. See route 1320.

Embodiments of the invention may also represent the actions associated with an entity in an actions Web Part. The actions Web Part displays a list of actions associated with the entity in various styles. It can connect to other entity Web Parts via Web Part connections to show, for example, the actions for a "customer" entity selected in a connected entity list. A Web Part is a modular unit of information that has a single purpose and that forms the basic building block of a Web Part Page. Each instance of a specific Web Part may be similar or different in appearance and behavior, but it is based on the same Web Part assembly file installed on the Web site server. A Web Part Page is a special type of Web Page that consolidates data such as lists and charts, and Web content such as text and images, into a dynamic information portal built around a common task or special interest. Each Web Part Page contains one or more Web Part zones, which in turn contain one or more Web Parts.

Figure 14:
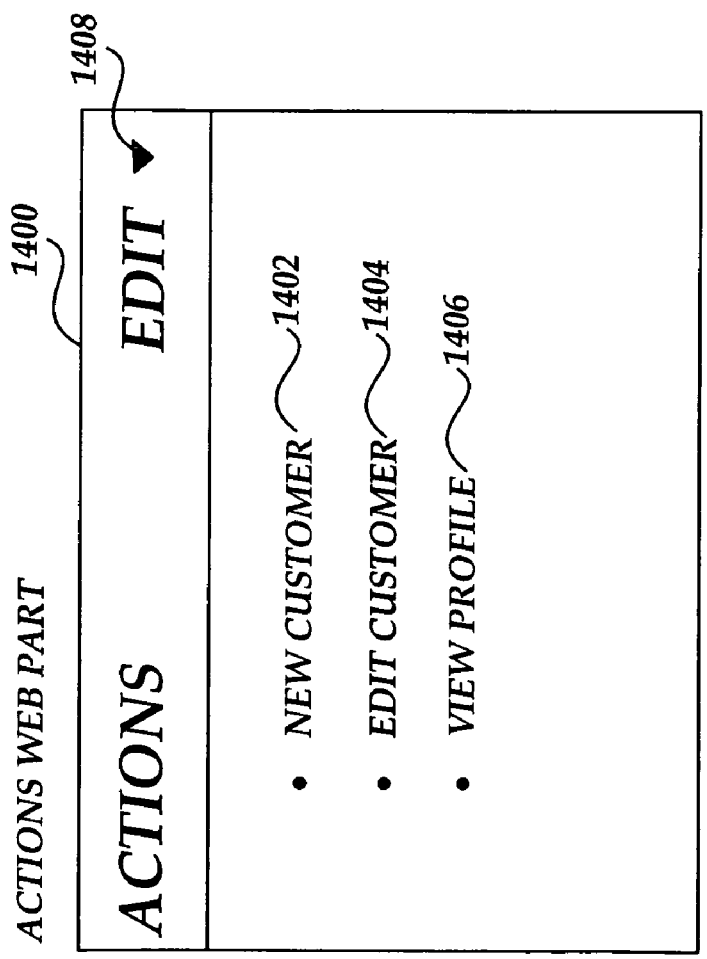
FIG. 14 is a pictorial diagram illustrating one exemplary implementation of an actions Web Part.

FIG. 14 illustrates one exemplary embodiment of an actions Web Part 1400 displaying the actions associated with an entity. For example, the actions Web Part 1400 illustrated by FIG. 14 lists three actions associated with a "customer" entity: new customer 1402, edit customer 1404, and view profile 1406. The actions Web Part 1400 also provides an edit mode 1408 that allows a user to edit the properties of the actions Web Part.

Figure 15:
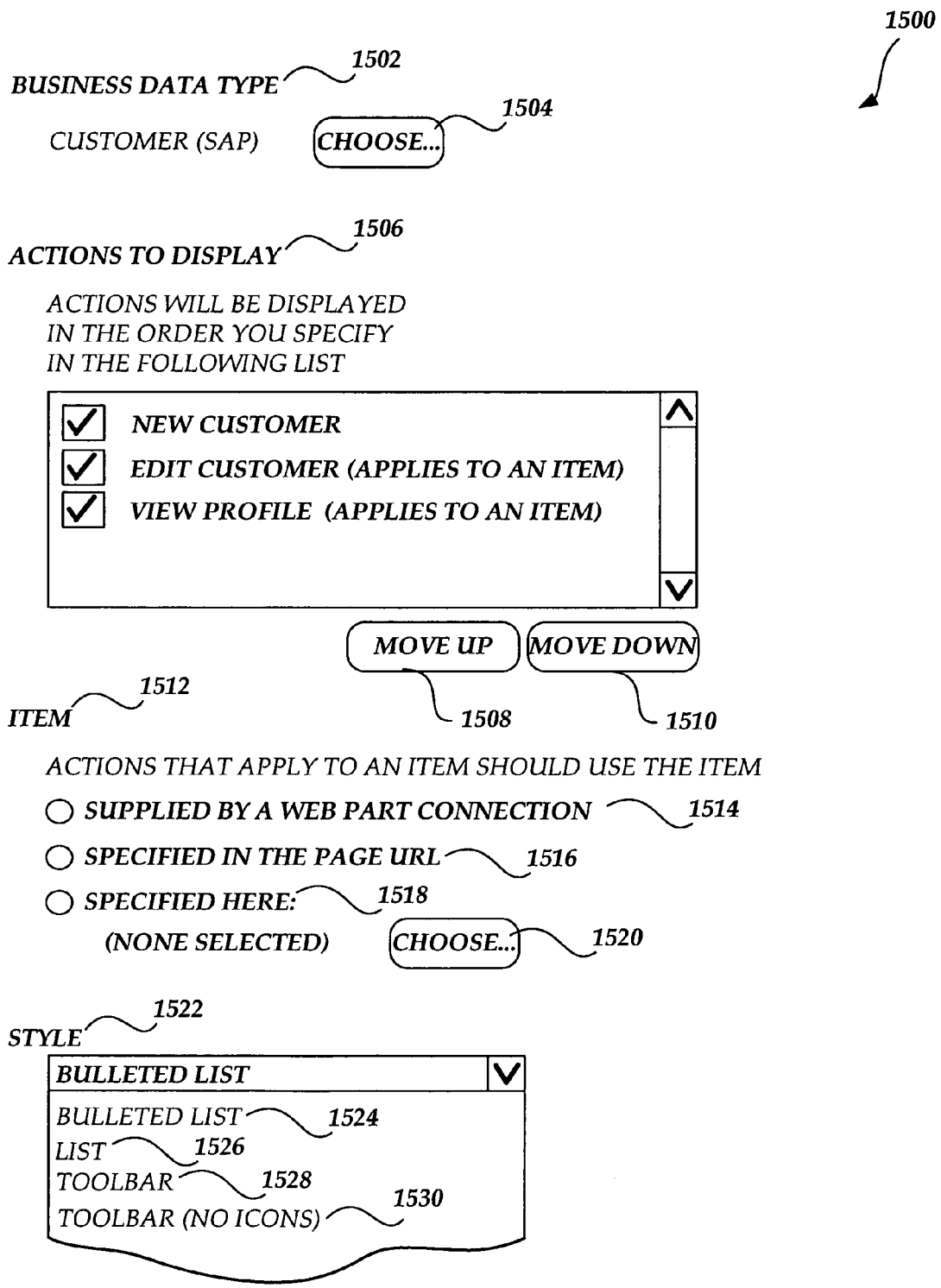
FIG. 15 is a pictorial diagram illustrating one exemplary implementation of setting various properties of an actions Web Part.

In some embodiments of the invention, a user interface is provided to enable a user to edit the properties associated with the actions Web Part 1400. FIG. 15 illustrates one exemplary user interface 1500 that allows a user to modify the properties associated with an actions Web Part 1400. The user interface 1500 allows a user to define the type of the entity 1502. For example, as illustrated by FIG. 15, the current entity "customer" is of type SAP. A user may click on the icon 1504 to change the entity type.

The user interface 1500 also allows a user to specify the order in which the actions will be displayed. For example, in FIG. 15, the three actions associated with the "customer" entity are displayed in the order of: new customer 1402, edit customer 1404, and view profile 1406. The user interface 1500 provides the "move up" icon 1508 and the "move down" icon 1510 for a user to adjust the order of the actions.

The user interface 1500 also allows a user to specify the entity that the actions should be applied to. For example, the user interface 1500 illustrated by FIG. 15 gives a user the option to specify the entity as one of "supplied by a Web Part connection" 1514, "specified in the page URL" 1516, or "specified by the user" 1518. The option of specifying the entity by the user 1518 is further supplemented by the user selecting the "choose" icon 1520 to specify the entity that the actions should be applied to.

The user interface 1500 further gives a user options to specify the style in which the actions Web Part 1400 is displayed. The options include bulleted list 1524, list 1526, toolbar 1528, and toolbar without icon 1530, etc. For example, FIG. 15 illustrates that the bulleted list 1524 is selected to be the style for the actions Web Part 1400.

In the illustrated exemplary embodiment of the present invention, a user may also specify the display order of the actions in an actions Web Part 1400. The user orders the actions by switching the actions Web Part 1400 into the edit mode 1408 and dragging and dropping each action. The user initiates a drag by pressing the mouse down on the text or icon of any action. The text and the icon representing the action are translucent when the user is dragging. As the user drags the action, a vertical or horizontal insertion bar appears to indicate where the action will be positioned if the user releases the mouse button. The drag ends when the user releases the mouse button. The actions Web Part updates itself with the actions repositioned.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A computing system for publication of actions associated with a current context of an entity, the computing system comprising: a processor, a display, and a memory containing computer readable instructions that, when executed by the processor, is configured to:
 a component for storing entities having at least one context, the at least one context relating to an environment in which a related entity is used, the at least one context comprising:
  at least one abstract context class, the at least one abstract context class holding common logic for said at least one context of each of the stored entities, the at least one abstract context class being chosen from a group comprising:
   an entity class, wherein the entity class is configured to:
    find entity data from various sources,
    extract a class name and an object key,
    return an object constructed based on the entity class and the object key, and
    provide class fields,
   an application context class, wherein the application context class is configured to:
    store information about a current client application,
    identify the current client application, and
    store the identified current client application,
   a user role context class wherein the user role context class is configured to:
    check an identity of a current thread,
    determine what role a user belongs to, and
    store the role the user belongs to, and
   a locale context class, wherein the locale context class is configured to store information about a current locale when an action depends on a current language of an application,
  at least one context provider,
  at least one context hash, and
  at least one context that is an interface that all context classes implement;
 a component for storing actions associated with the entities, the actions describing the entities' activities, the actions containing a display method that presents the actions to the user, the actions containing an execution method for performing the entities' activities, and the actions stored separately from the entities; and
 a software component, coupled to the component for storing entities and the component for storing actions associated with the entities, for providing information about the entity's activities in the current context of the entity, the software component comprising a context provider module that identifies the current context of the entity, an action provider module that queries the component for storing actions and retrieves the actions associated with the current context of the entity using a keyword associated with the context, and a context resolver that translates the context into a corresponding keyword and returns the keyword associated with the context of the action provider module.

2. The computing system of claim 1, further comprising a client application for requesting the current context and the actions associated with the current context of the entity.

3. The computing system of claim 2, wherein the client application displays the actions associated with the current context of the entity.

4. The computing system of claim 1, wherein the software component integrates additional contexts provided by a third party.

5. The computing system of claim 1, wherein the component for storing actions integrates additional actions provided by a third party.

6. A computer-implemented method for publication of actions associated with a current context of an entity, comprising:
 upon receiving a request for at least one context associated with the entity, providing the at least one context, the at least one context relating to an environment in which a related entity is used, the at least one context comprising:
  at least one abstract context class, the at least one abstract context class holding common logic for the at least one context of each of the entities, the at least one abstract context class being chosen from a group comprising:
   an entity class, wherein the entity class comprises:
    finding entity data from various sources,
    extracting a class name and an object key,
    returning an object constructed based on the entity class and the object key, and
    providing class fields,
   an application context class, wherein the application context class comprises:
    storing information about a current client application,
    identifying the current client application, and
    store the identified current client application,
   a user role context class, wherein the user role context class comprises:
    checking an identity of a current thread,
    determining what role a user belongs to, and
    storing the role the user belongs to, and
   a locale context class, wherein the locale context class comprises storing information about a current locale when a action depends on a current language of an application,
  at least one context provider,
  at least one context hash, and
  at least one context that is an interface that all context classes implement; and
 upon receiving a request for actions associated with the current context of the entity,
 providing the actions, wherein providing the actions comprises:
  describing, by the actions, the entities' activities,
  presenting the actions to the user comprising a display method,
  providing an execution method for performing the entities' activities,
  storing separately the actions from the entities,
  translating the at least one provided context into at least one corresponding keyword,
  querying a component for storing actions associated with the entity, and
  retrieving actions including the at least one corresponding keyword as at least one annotation.

7. The computer-implemented method of claim 6, wherein providing the at least one context further comprises:
 obtaining information about the at least one context; and
 creating an object instance for the at least one context.

8. The computer-implemented method of claim 7, further comprising: creating the at least one context hash object containing the object instance of the at least one context.

9. The computer-implemented method of claim 6, wherein retrieving actions including the at least one corresponding keyword as the at least one annotation further comprises retrieving actions comprising: all of the at least one corresponding keywords and any of the at least one corresponding keywords as annotations.

10. The computer-implemented method of claim 6, wherein retrieving actions including the at least one corresponding keyword as the at least one annotation further comprises retrieving actions including at least one of the at least one corresponding keywords as an annotation.

11. The computer-implemented method of claim 6, further comprising displaying the actions associated with the current context of the entity.

12. A computer-readable storage medium containing computer-executable instructions that, when executed by a computer, causes the computer to perform a method for publication of actions associated with a current context of an entity, the method comprising:
   upon receiving a request for at least one context associated with the entity, providing the at least one context, the at least one context relating to an environment in which the entity is used, the at least one context comprising:
      at least one abstract context class, the at least one abstract context class holding common logic for the at least one context of each of the entities, the at least one abstract context class being chosen from a group comprising:
         an entity class, wherein the entity class comprises:
            finding entity data from various sources,
            extracting a class name and an object key,
            returning an object constructed based on the entity class and the object key, and
            providing class fields,
         an application context class, wherein the application context class comprises:
            storing information about a current client application,
            identifying the current client application, and
            store the identified current client application,
         a user role context class wherein the user role context class comprises:
            checking an identity of a current thread,
            determining what role a user belongs to, and
            storing the role the user belongs to, and
         a locale context class, wherein the locale context class comprises storing information about a current locale when a action depends on a current language of an application,
      at least one context provider,
      at least one context hash, and
      at least one context that is an interface that all context classes implement; and
   upon receiving a request for actions associated with the current context of the entity,
   providing the actions, wherein providing the actions comprises:
      describing, by the actions, the entities' activities,
      presenting the actions to the user comprising a display method,
      providing an execution method for performing the entities' activities,
      separately storing the actions from the entities,
      translating the at least one provided context into a corresponding keyword,
      querying a component for storing actions associated with the entity, and
      retrieving actions including the at least one corresponding keyword as at least one annotation.

13. The computer-readable storage medium of claim 12, wherein providing the at least one context further comprises:
   obtaining information about the at least one context; and
   creating an object instance for the at least one context.

14. The computer-readable storage medium of claim 13, further comprising: creating the at least one context hash object containing the object instance of the at least one context.

15. The computer-readable storage medium of claim 12, wherein retrieving actions including the at least one corresponding keyword as the at least one annotation further comprises retrieving actions comprising: all of the at least one corresponding keywords and any of the at least one corresponding keywords as annotations.

16. The computer-readable storage medium of claim 12, wherein retrieving actions including the at least one corresponding keyword as the at least one annotation further comprises retrieving actions including at least one of the at least one corresponding keywords as an annotation.

17. The computer-readable storage medium of claim 12, further comprising displaying the actions associated with the current context of the entity.

* * * * *

UNITED STATES PATENT AND TRADEMARK OFFICE
CERTIFICATE OF CORRECTION

| | | |
|---|---|---|
| PATENT NO. | : 7,603,381 B2 | Page 1 of 1 |
| APPLICATION NO. | : 10/955945 | |
| DATED | : October 13, 2009 | |
| INVENTOR(S) | : Jonah Sarbin Burke et al. | |

It is certified that error appears in the above-identified patent and that said Letters Patent is hereby corrected as shown below:

In the Specifications:

In column 2, line 38, after "storage" insert -- medium, --.

In the Claims:

In column 17, line 33, in Claim 1, delete "class" and insert -- class, --, therefor.

In column 19, line 44, in Claim 12, delete "class" and insert -- class, --, therefor.

Signed and Sealed this
First Day of February, 2011

David J. Kappos
*Director of the United States Patent and Trademark Office*